US011349836B2

(12) United States Patent
Hearty et al.

(10) Patent No.: US 11,349,836 B2
(45) Date of Patent: May 31, 2022

(54) ACCOUNT RECOMMENDATION BASED ON SERVER-SIDE, PERSISTENT DEVICE IDENTIFICATION

(71) Applicant: MASTERCARD TECHNOLOGIES CANADA ULC, Vancouver (CA)

(72) Inventors: John Hearty, Vancouver (CA); Hanhan Wu, Surrey (CA); Randy Lukashuk, Errington (CA); Anton Laptiev, Vancouver (CA); Jake Madison, Vancouver (CA); Christopher Bailey, Langley (CA); Igor Opushnyev, New Westminster (CA); Parin Prashant Shah, Vancouver (CA); Sik Suen Chan, Richmond (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 424 days.

(21) Appl. No.: 16/592,354

(22) Filed: Oct. 3, 2019

(65) Prior Publication Data
US 2020/0112562 A1 Apr. 9, 2020

Related U.S. Application Data

(60) Provisional application No. 62/845,633, filed on May 9, 2019, provisional application No. 62/805,714, filed
(Continued)

(51) Int. Cl.
*G06F 17/18* (2006.01)
*H04L 9/40* (2022.01)
(52) U.S. Cl.
CPC .......... *H04L 63/0876* (2013.01); *G06F 17/18* (2013.01); *H04L 63/0853* (2013.01); *H04L 63/0884* (2013.01); *H04L 63/0892* (2013.01)

(58) Field of Classification Search
CPC ............ H04L 63/0876; H04L 63/0853; H04L 63/0884; H04L 63/0892; G06F 17/18; G06F 21/44
See application file for complete search history.

(56) References Cited

U.S. PATENT DOCUMENTS

| 9,503,537 | B1 | 11/2016 | Neshmonin et al. |
| 2003/0208684 | A1 | 11/2003 | Camacho et al. |

(Continued)

FOREIGN PATENT DOCUMENTS

| EP | 2973282 | 1/2016 |
| WO | 2013006538 | 1/2013 |
| WO | 2013142722 | 9/2013 |

OTHER PUBLICATIONS

International Search Report and Written Opinion for application No. PCT/CA2019/051416, dated Nov. 28, 2019 (9 pages).

(Continued)

*Primary Examiner* — Huan V Doan
(74) *Attorney, Agent, or Firm* — Michael Best & Friedrich LLP

(57) ABSTRACT

An account recommendation system that includes a server. The server is operable to identify a user account based on a server-side persistent device identification. The server includes a processor and a memory. The server is configured to receive a request including one or more attributes related to a client device, identify the server-side persistent device identification ("PDI") record for the client device based on the one or more attributes of the client device, identify one or more candidate accounts based on the server-side persistent device identification, determine confidence scores for each of the one or more candidate accounts, generate a recommendation signal for the user account associated with
(Continued)

the client device based on the confidence scores, and transmit the recommendation signal to a merchant server.

20 Claims, 26 Drawing Sheets

Related U.S. Application Data on Feb. 14, 2019, provisional application No. 62/742,110, filed on Oct. 5, 2018.

(56) References Cited

U.S. PATENT DOCUMENTS

| | | |
|---|---|---|
| 2008/0275748 A1 | 11/2008 | John et al. |
| 2019/0095898 A1* | 3/2019 | Bhatia ................... G06Q 20/12 |
| 2019/0108572 A1* | 4/2019 | Or .......................... H04W 4/14 |

OTHER PUBLICATIONS

International Search Report and Written Opinion for application No. PCT/CA2019/051421, dated Dec. 23, 2019 (9 pages).

\* cited by examiner

ACCOUNT RECOMMENDATION BASED ON SERVER-SIDE, PERSISTENT DEVICE IDENTIFICATION

RELATED APPLICATIONS

This application claims the benefit of U.S. Provisional Patent Application No. 62/742,110, filed Oct. 5, 2018, U.S. Provisional Patent Application No. 62/805,714, filed Feb. 14, 2019, and U.S. Provisional Patent Application No. 62/845,633, filed May 9, 2019, the entire contents of all of which are hereby incorporated by reference.

FIELD

Embodiments described herein relate to the use of attributes associated with a device to identify the device.

BACKGROUND

Device identification is conventionally achieved based on individual cookies, html storage, and other client-side data or client-side attributes. Client-side data and client-side attributes of client devices are provided to servers by client devices via JavaScript, native mobile SDKs, etc.

SUMMARY

Embodiments described herein relate to the use of attributes associated with a device to identify the device. Specifically, the attributes associated with the device are used to achieve a persistent device identification ("PDI") for fraud prevention systems. For example, PDI can be a server-side fraud prevention technique that can be used to prevent user account take over (e.g., relating to merchant accounts, accounts associated with financial institutions, etc.) by an unwanted third party. PDI improves fraud prevention systems' ability to identify and track user devices. By increasing the unique characteristics or attributes that can be associated with a particular user device (as accumulated over time via a number of transactions), PDI improves the efficiency of device identification and the prevention of fraudulent account takeover. This aggregation of unique characteristics and attributes also makes device identification and fraud prevention more robust by making device identification and fraud prevention more resilient to attribute changes or intentional obfuscation. For example, some fraud prevention and identification systems bind reliable and different attributes together (e.g., via hashing), which can result in an entire identifier being changed as the result of natural or artificial changes to its underlying attributes. PDI, however, is resilient to such changes. As a result, PDI provides device identification and fraud prevention with significantly greater longevity than conventional device identification and fraud prevention schemes. One advantageous byproduct of this longevity is the ability to use PDI to track attacker devices across otherwise dissimilar and well-obfuscated attacks.

PDI can utilize any number of different types of attributes such as device identification tokens (e.g., cookies), device fingerprints (e.g., device hardware fingerprints), location service technologies, network specific attributes, and historical activity associated with device identification to manage, identify, and verify a specific device and prevent fraudulent account takeover. PDI can also use PDI tokens and associated PDI records to uniquely identify devices across, for example, different locations and different accounts.

PDI tokens and PDI records permit, for example, a server to identify a device even if cookies or other data stores on the device are refreshed or drift over time, which is often the case when end users periodically update software applications on the device. Additionally, if a double-break event occurs in which both a device identification token (e.g., a cookie) and a device fingerprint (e.g., device hardware fingerprint) are lost, the server can still evaluate other user activity and server-side attributes of a device to identify the device. User activity and server-side attributes include, for example, user agent, operating system attributes, browser attributes, network attributes, account identifier ("ID"), geospatial data, Internet protocol ("IP") address, hardware sensor information, onboard sensor information, etc.

PDI also enables the identification of a device based solely on the server-side attributes (e.g., IP address, IP network information, HTTP headers such as user agent, etc.) when no data is received from a client-side device. As a result, PDI improves a fraud prevention system's ability to identify and segment non-JavaScript browsers or other scenarios where HTTP traffic is directed to a client application web server (e.g., automated web traffic, site aggregators, etc.).

Embodiments described herein provide a fraud prevention system that includes a server. The server is operable to identify a client device based on one or more attributes associated with the client device. The server includes a processor and a memory. The server is configured to receive a first attribute of the client device from the client device and associated with a first transaction, receive a second attribute of the client device from the client device and associated with the first transaction, receive a third attribute related to the client device and associated with the first transaction, and generate, using the processor, a persistent device identification ("PDI") record including the first attribute of the client device, the second attribute of the client device, and the third attribute related to the client device. The first attribute has a first value, the second attribute has a second value, and the third attribute has a third value. The server is also configured to store the PDI record in the memory and receive the third attribute related to the client device and associated with a second transaction. The third attribute has the third value. The server is also configured to identify the client device using the PDI record based on the third attribute related to the client device and associated with the second transaction without receiving, in association with the second transaction, the first attribute of the client device having the first value and the second attribute of the client device having the second value.

Embodiments described herein provide a fraud prevention system that includes a server operable to identify a client device based on one or more attributes associated with the client device. The server includes a processor and a memory. The server is configured to receive a first attribute of the client device and associated with a first transaction and receive a second attribute related to the client device and associated with the first transaction. The first attribute has a first value, and the second attribute has a second value. The server is further configured to generate, using the processor, a persistent device identification ("PDI") record including the first attribute of the client device and the second attribute related to the client device, store the PDI record in the memory, and receive the second attribute related to the client device and associated with a second transaction. The second attribute has the second value. The server is further configured to identify the PDI record based on the second attribute related to the client device and associated with the second transaction without receiving, in association with the second transaction, the first attribute of the client device having the first value.

Embodiments described herein provide a fraud prevention method for identifying a client device based on one or more attributes associated with the client device. The method includes receiving, at a server, a first attribute of the client device and associated with a first transaction, and receiving, at the server, a second attribute related to the client device and associated with the first transaction. The first attribute has a first value, and the second attribute has a second value. The method further includes generating, using a processor of the server, a persistent device identification ("PDI") record including the first attribute of the client device and the second attribute related to the client device, storing the PDI record in a memory or the server, and receiving, at the server, the second attribute related to the client device and associated with a second transaction. The second attribute has the second value. The method further includes identifying the PDI record based on the second attribute related to the client device and associated with the second transaction without receiving, in association with the second transaction, the first attribute of the client device having the first value.

Embodiments described herein provide a non-transitory computer readable medium including computer executable instructions stored in the computer readable medium for controlling a device to receive a request including one or more attributes related to a client device, identify a server-side persistent device identification ("PDI") record for the client device based on the one or more attributes of the client device, identify a plurality of candidate accounts based on the server-side PDI record, determine confidence scores for each of the plurality candidate accounts, identify a candidate account of the plurality of candidate accounts having a highest value for a confidence score, generate a recommendation signal for a user account associated with the client device based on the candidate account of the plurality of candidate accounts having the highest value for the confidence score, and transmit the recommendation signal to a merchant server.

Embodiments described herein provide an account recommendation system that includes a server. The server is operable to identify a user account based on a server-side persistent device identification. The server includes a processor and a memory. The server is configured to receive a request including one or more attributes related to a client device, identify the server-side persistent device identification ("PDI") record for the client device based on the one or more attributes of the client device, identify one or more candidate accounts based on the server-side persistent device identification, determine confidence scores for each of the one or more candidate accounts, generate a recommendation signal for the user account associated with the client device based on the confidence scores, and transmit the recommendation signal to a merchant server.

Embodiments described herein provide an account recommendation method. The method includes receiving, at a server, a request including one or more attributes related to a client device, identifying a server-side persistent device identification ("PDI") record for the client device based on the one or more attributes of the client device, identifying one or more candidate accounts based on the server-side PDI record, determining confidence scores for the one or more candidate accounts, generating a recommendation signal for a user account associated with the client device based on the confidence scores, and transmitting the recommendation signal to a merchant server.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to persistent device identification ("PDI") for a fraud prevention system in the absence of one or more pieces of device identifying information. PDI can be achieved based on device identification tokens, IP addresses, device fingerprinting (e.g., device hardware fingerprinting), device attributes, location, and other information related to a device. For example, if a device fingerprint is generated for a particular device and a user changes time zone settings on the device, a new device fingerprint is generated. Similarly, a user may delete browser cookies and/or browsing history, which results in losing a device identification token. Each of these illustrative scenarios makes it difficult to consistently track and verify device identities over time. PDI involves the use of PDI records that include historical data associated with the activity of a device (e.g., device identification tokens, IP addresses, device fingerprints, and other attributes). When, for example, a new device fingerprint is associated with an existing device identification token, a PDI record links or attaches the new device fingerprint to the device identification token for tracking and verifying the device. However, the PDI records are not tied to specific cookies, html storage, or other client-provided data source. Rather, the PDI records are created and maintained server-side, and can survive the destruction of individual cookies, html storage, and other client-provided data that is otherwise stored at the client device(s).

Figure 1:
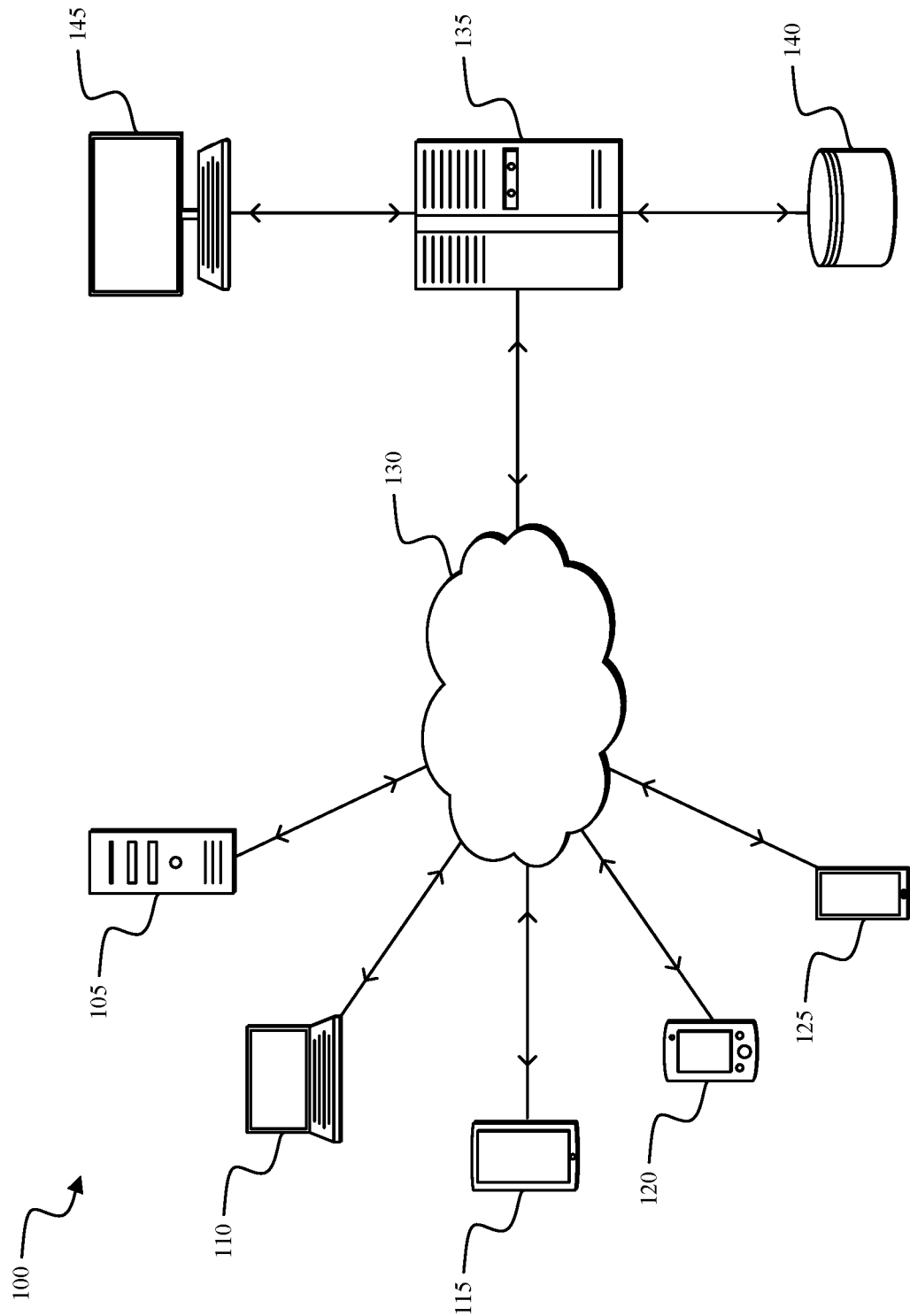
FIG. 1 illustrates a fraud prevention system, according to embodiments described herein.

FIG. 1 illustrates a fraud prevention system 100 for persistent device identification ("PDI") that is operable or configured to maintain a consistent and continuous identification for a client device. The system 100 includes a plurality of client-side devices 105-125, a network 130, a server-side mainframe computer or server 135, a database 140, and a server-side user interface 145 (e.g., a workstation). The plurality of client-side data input devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the devices 105-125 is configured to communicatively connect to the server 135 through the network 130 and provide information to the server 135 related to attributes or values for attributes of the devices 105-125. Attributes of the devices 105-125 include, for example, user agent, operating system, account identifier ("ID"), location, time of day, etc. The attributes or values for attributes related to the devices 105-125 can be provided to the server 135 through an application program installed on the devices 105-125. Attribute information received from the devices 105-125 at the server 135 can be stored in the database 140.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the devices 105-125 and the network 130 are, for example, wired connections, wireless connections, or a combination of wireless and wired connections. Similarly, the connections between the server 135 and the network 130 are wired connections, wireless connections, or a combination of wireless and wired connections.

Figure 2:
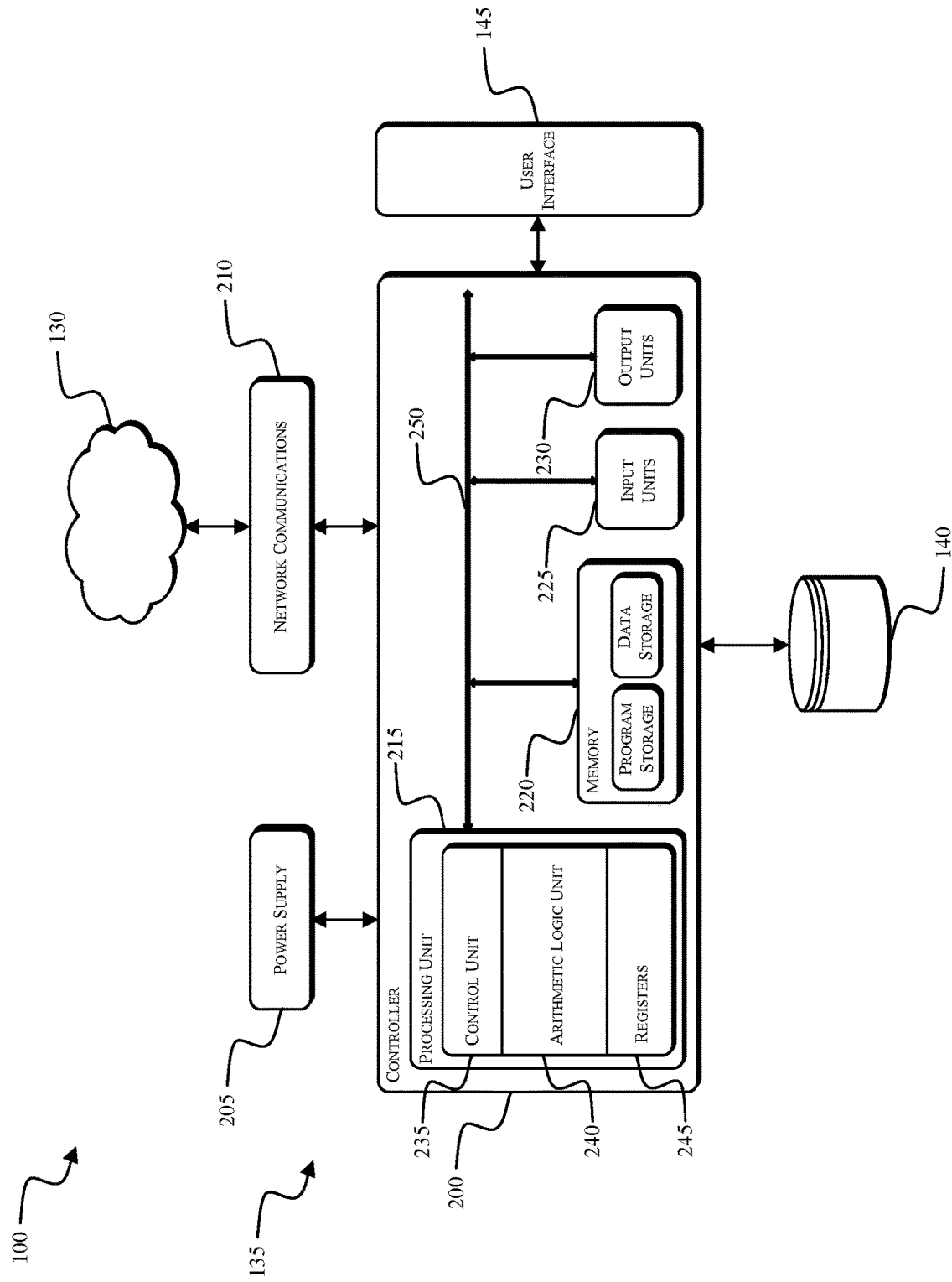
FIG. 2 illustrates a server-side processing device of the fraud prevention system of FIG. 1, according to embodiments described herein.

FIG. 2 illustrates the server-side of the system 100 with respect to the server 135. The server 135 is electrically and/or communicatively connected to a variety of modules or components of the system 100. For example, the illustrated server 135 is connected to the database 140 and the user interface 145. The server 135 includes a controller 200, a power supply module 205, and a network communications module 210. The controller 200 includes combinations of hardware and software that are operable to, for example, provide PDI for the devices 105-125. The controller 200 includes a plurality of electrical and electronic components that provide power, operational control, and protection to the components and modules within the controller 200 and/or the system 100. For example, the controller 200 includes, among other things, a processing unit 215 (e.g., a microprocessor, a microcontroller, or another suitable programmable device), a memory 220, input units 225, and output units 230. The processing unit 215 includes, among other things, a control unit 235, an arithmetic logic unit ("ALU") 240, and a plurality of registers 245 (shown is a group of registers in FIG. 2) and is implemented using a known architecture. The processing unit 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 215 is connected to the memory 220 and executes software instructions that are capable of being stored in a RAM of the memory 220 (e.g., during execution), a ROM of the memory 220 (e.g., on a generally permanent basis), or another non-transitory computer readable data storage medium such as another memory or a disc.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. In some embodiments, the network communications module 210 includes an application programming interface ("API") for the server 135. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the PDI techniques described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 145 includes a combination of digital and analog input or output devices required to achieve a desired level of control and monitoring for the system 100. For example, the user interface 145 includes a display (e.g., a primary display, a secondary display, etc.) and input devices such as a mouse, touch-screen displays, a plurality of knobs, dials, switches, buttons, etc. The display is, for example, a liquid crystal display ("LCD"), a light-emitting diode ("LED") display, an organic LED ("OLED") display, or the like.

Figure 3:
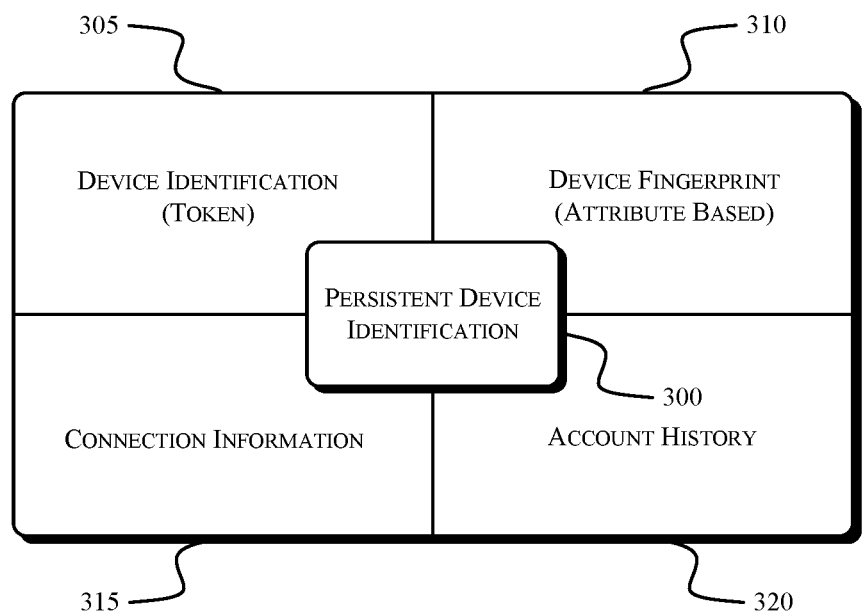
FIG. 3 illustrates persistent device identification ("PDI") for a device including various attributes associated with the device, according to embodiments described herein.

The server 135 is configured to maintain persistent (e.g., consistent and continuous) device identifications for each of the devices 105-125. The server 135 maintains the device identifications for the devices 105-125 even if there is a partial loss of attributes or identifiers associated with one or more of the devices 105-125. The server 135 maintains the device identifications by implementing a PDI token and a PDI record. The PDI token can be used to retrieve the PDI record. With reference to FIG. 3, a PDI record 300 is implemented based on, for example, a first type of device information or attribute 305, a second type of device information or attribute 310, a third type of device information or attribute 315, and a fourth type of device information or attribute 320. The PDI record 300 can include various types of information associated with the attributes of the devices 105-125 (e.g., device identification token, device fingerprint, user agent, operating system attributes, browser attributes, network attributes, account ID, location, time of day, IP address, information from accelerometers, etc.). In the illustrated implementation, the first type of device information 305 is device identification information (e.g., a token), the second type of device information 310 is an attribute-based device fingerprint (e.g., a device hardware fingerprint), the third type of device information 315 is network connection information, and a fourth type of device information 320 is device account history. Based on values for the attributes associated with the first type of device information 305, second type of device information 310, third type of device information 315, and fourth type of device information 320, the server 135 is able to maintain the PDI record 300 for devices 105-125 even when some information that would conventionally be required to identify the devices 105-125 is unavailable.

Figure 4:
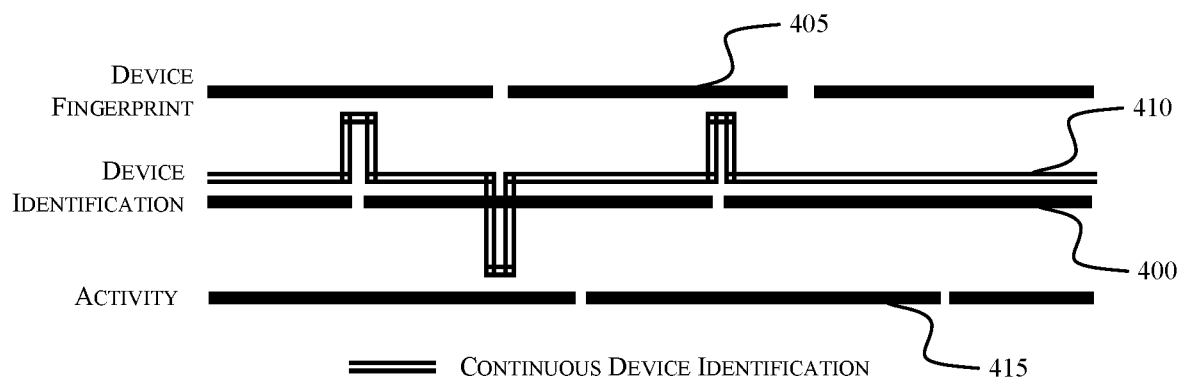
FIG. 4 illustrates aspects of PDI over time, according to embodiments described herein.

FIG. 4 illustrates a scenario in which two or three attributes are used by the server 135 to maintain PDI for one of the devices 105-125. In some implementations, more than three attributes are used by the server 125 to maintain PDI for one of the devices 105-125 (e.g. fifteen attributes can be used). In the illustrated example, a first device attribute 400 (e.g., a device identification token) is lost due to a user deleting their cookies. The server 135 is able to maintain the identification of the device 105-125, however, based on a second device attribute 405 (e.g., a device hardware fingerprint). The continuity of the device identification is illustrated using the continuous trace 410. When the first device attribute 400 is unavailable or a value for the first device attribute has changed, the second device attribute 405 can be used by the server 135. When, for example, a double-break event occurs where both the first device attribute 400 and the second device attribute 405 are unavailable or values for the first and second device attributes have changed, the server 135 can use a third device attribute 415 (e.g., user activity or another attribute) to maintain the identification of the device 105-125. In some implementations, the third device attribute 415 includes operating system, browser, screen resolution, cookie settings, time zone, local storage, HTML5 canvas, WebGL, browser plugin, network characteristics, and historical activity associated with identity-affirming actions, etc.

Figure 5:
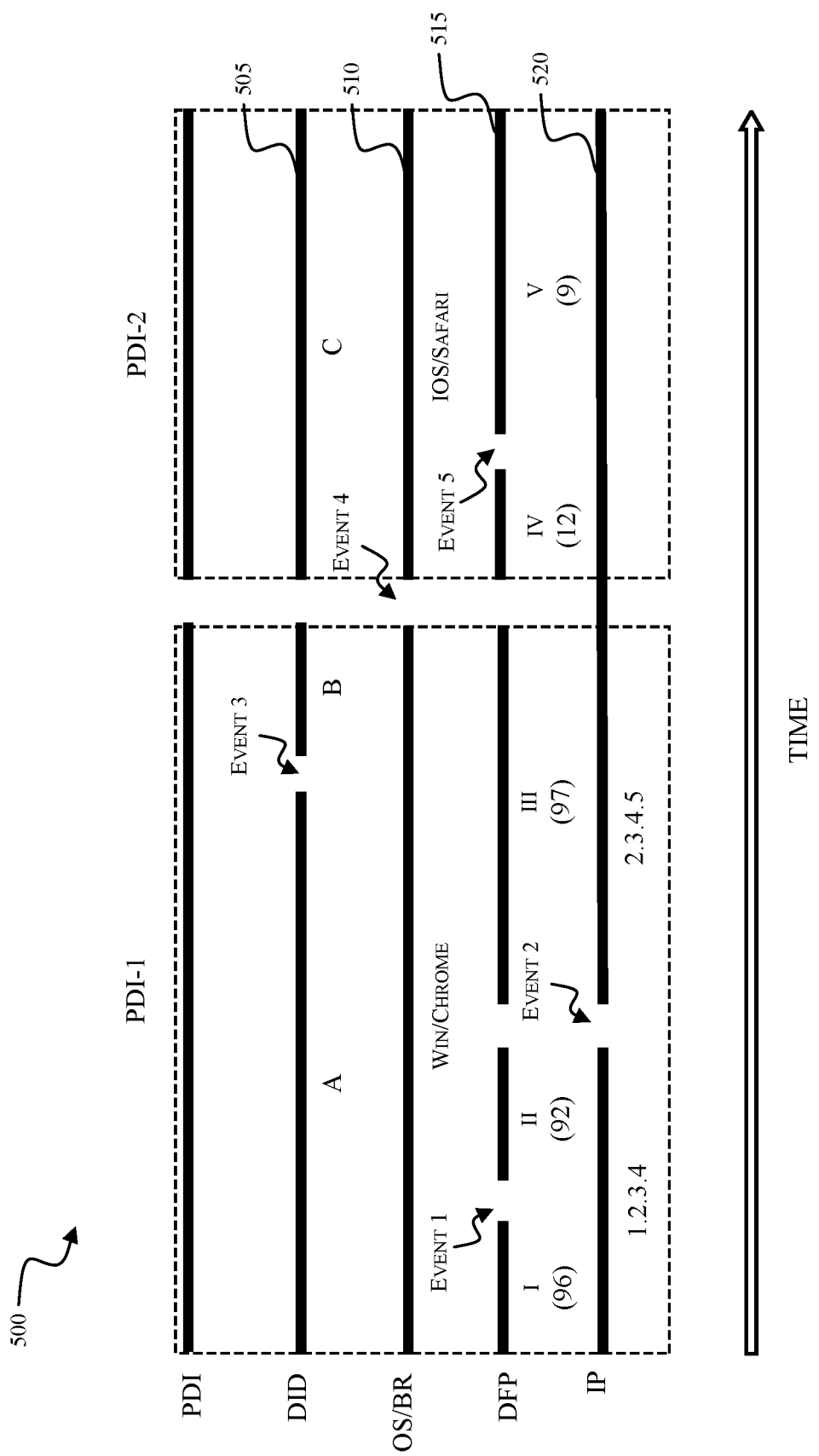
FIG. 5 illustrates additional aspects of PDI, according to embodiments described herein.
Figure 6:
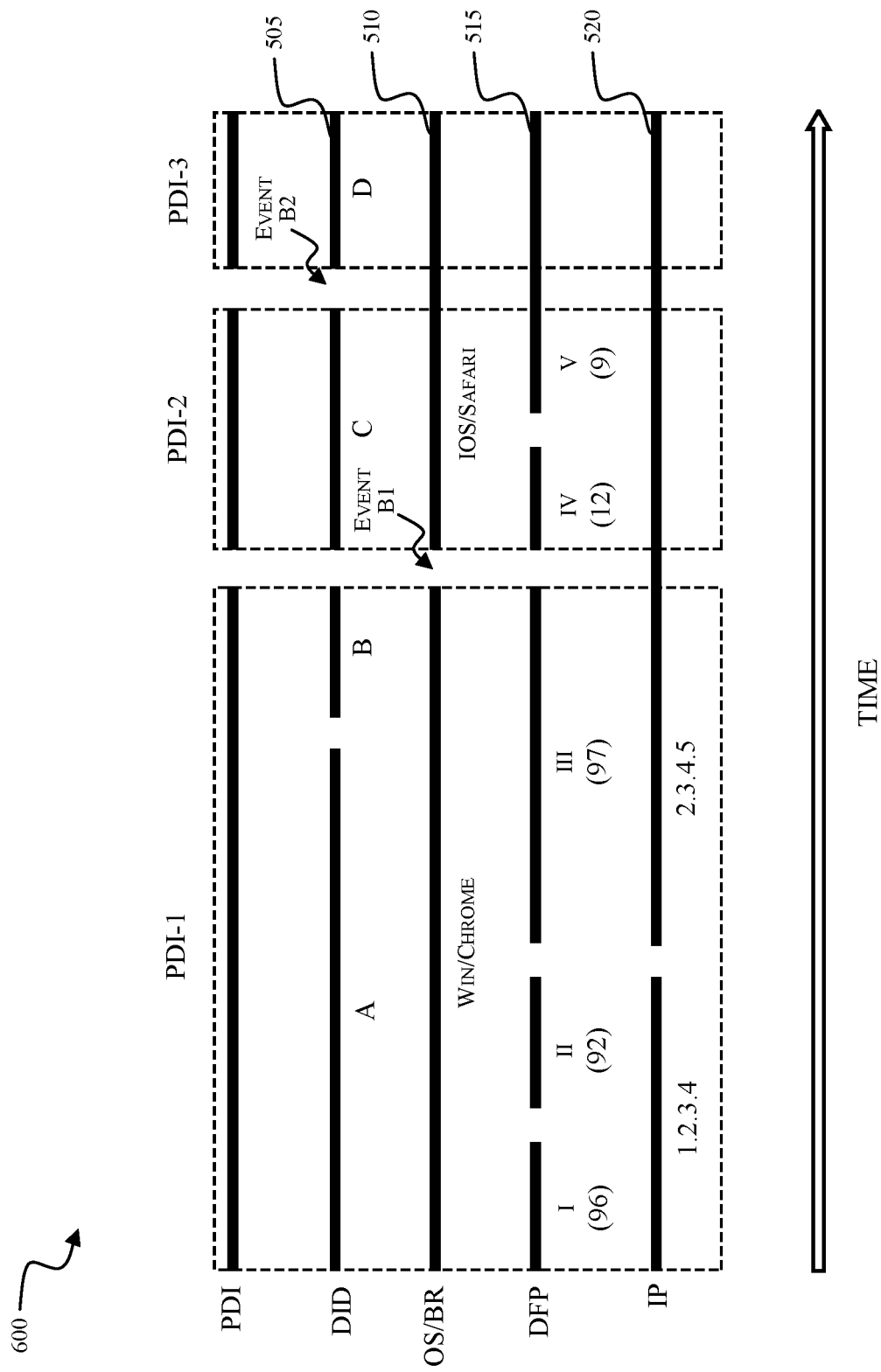
FIG. 6 illustrates additional aspects of PDI, according to embodiments described herein.
Figure 7:
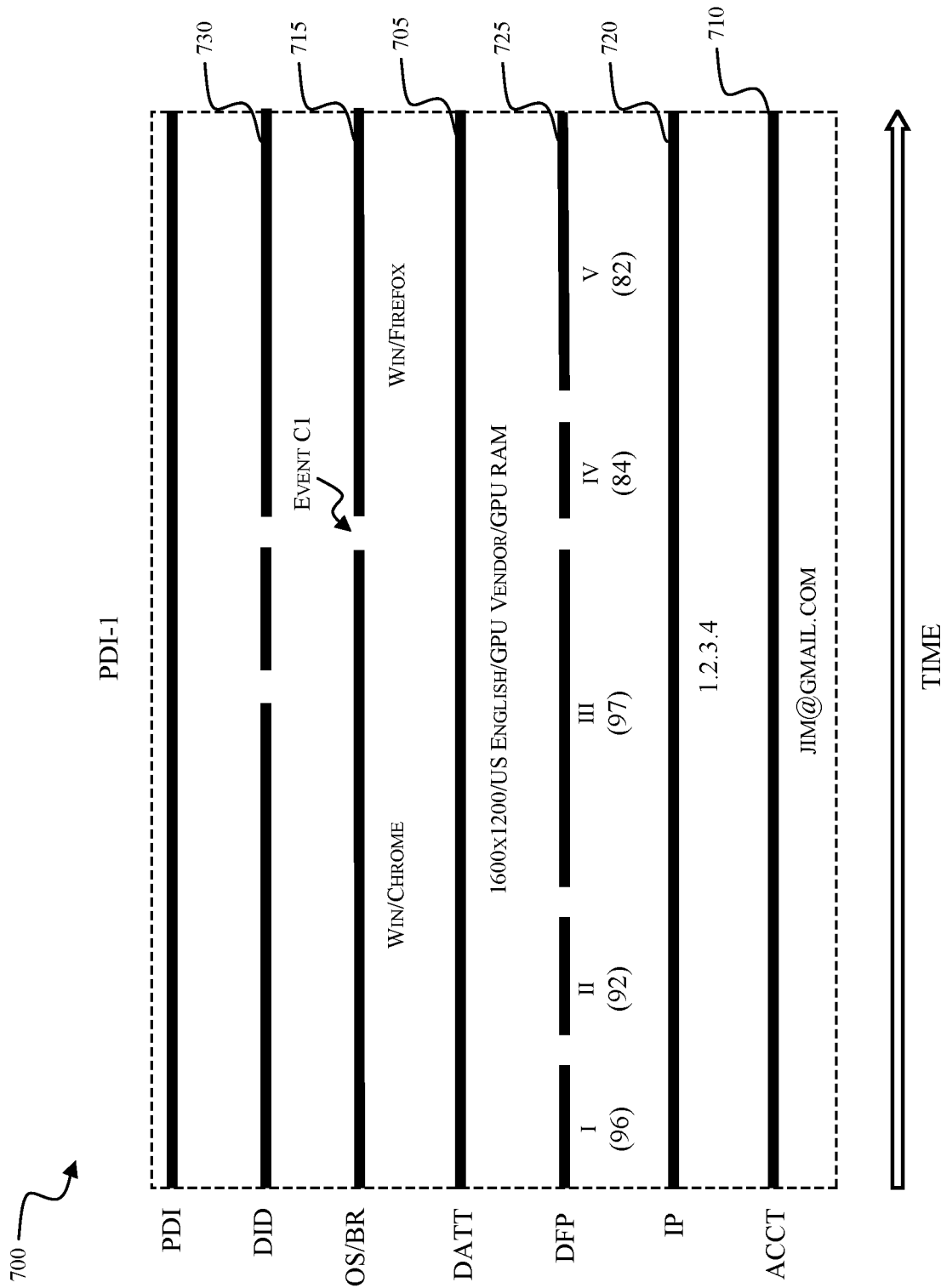
FIG. 7 illustrates additional aspects of PDI, according to embodiments described herein.

The operation of the server 135 in maintaining PDI for the devices 105-125 is described in an exemplary, transaction-based manner with respect to FIGS. 5, 6, and 7. FIG. 5 illustrates a scenario 500 where an end-user applies a software and/or hardware update to a device 105-125 over time, or periodically resets the device 105-125 by clearing cookies in a web browser, reinstalling a native mobile application, etc. The scenario 500 is described with respect to a first device attribute 505 (e.g., a device identification token), a second device attribute 510 (e.g., an operating system type or browser type), a third device attribute 515 (e.g., a device hardware fingerprint), and a fourth device attribute 520 (e.g., IP address). In the illustrated scenario 500, the device 105-125 has a first associated PDI record, PDI-1, and a second associated PDI record, PDI-2.

At EVENT 1, a user attempts to perform a transaction (e.g., a financial transaction) using a different time zone (e.g., Eastern Time vs. Pacific Time) than a prior transaction, which changes the value for the device 105-125's fingerprint 515 (i.e., from DFP[I] to DFP[II]). However, other information related to the device 105-125 has remained unchanged. For example, the user may have the same device identification token 505, operating system/browser 510, and IP address 520 as he or she had at the time of the prior transaction. Under these circumstances, the first associated PDI record, PDI-1, can be updated with the new value for the device fingerprint (i.e., based on the different time zone) and the device 105-125's identification can be verified so the transaction can be completed.

At EVENT 2, the user upgrades their home Internet access and performs a transaction using a new IP address 520. The device fingerprint 515 is also new because the user also upgraded a desktop monitor. The device identification token 505 and operating system/browser 510 remain unchanged. The server 135 determines that the new device fingerprint is a high-entropy device fingerprint (i.e., DFP [III] having a device fingerprint entropy of 97). The server 135 also determines that the new IP address 520 doesn't have a long history of device fingerprints and is unlikely to be a shared proxy. As a result, the server 135 updates the first associated PDI record, PDI-1, with the new values for device fingerprint and IP address. In some implementations, a device identification token 505 is valid for approximately thirty days before being wiped by a browser. In other implementations, a device identification token is immediately wiped by a browser. In implementations where a device identification token 505 persists after a new device fingerprint is generated, the device identification token only remains useful for device identification until being wiped by a browser. As such, the PDI record linking the new device fingerprint 515 to the device identification token 505 enables improved ability to identify the device. Without the PDI record, a user could be forced to submit to further authentication of the device (i.e., decreased efficiency of device identification) after the device identification token 505 is wiped or, in the worst case scenario, have an account be fraudulently taken over (i.e., failure of a fraud prevention system).

Device fingerprint entropy is a measure the uniqueness or distinctness of a device fingerprint. The higher the entropy value is, the more identifiable the device fingerprint. For example, desktop machines running less popular operating systems typically produce the highest device fingerprint entropy values. Fixed-hardware mobile devices (e.g., smartphones) typically produce the lowest device fingerprint entropy values.

At EVENT 3, the user clears browser history and cookies, which results in a new device identification token 505 associated with a new transaction. However, the operating system/browser 510, IP address 520, and device fingerprint 515 match attribute values for a prior transaction. As a result, the server 135 updates the first associated PDI record, PDI-1, with the new device identification token 505.

At EVENT 4, the attempts to perform a transaction for which the server 135 identifies a different operating system (e.g., IOS) and browser (e.g., Safari) associated with the IP address 520. The transaction also has a device identification token not associated with a PDI record. In the illustrated circumstance, the server 135 creates the second PDI record, PDI-2, and attaches or links the associated device identification token 505, device fingerprint 515, and IP address to the second PDI record, PDI-2.

At EVENT 5, the user upgrades the device 105-125, which results in a different device fingerprint 515 associated with a new attempted transaction. The device identification token 505, operating system/browser 510, and IP address remain unchanged from a prior transaction. The server 135 determines that the device fingerprint is a low-entropy device fingerprint. As a result, the server 135 is unable to identify the device based on the device fingerprint. However, because the device identification token 505 is the same, and device identification tokens generally cannot be shared across devices, the server 135 attaches the new device fingerprint 515 to the second associated PDI record, PDI-2.

FIG. 6 illustrates a scenario 600 that is an extension of the scenario 500 described above with respect to FIG. 5. In the scenario 600, a new device 105-125 or a new install of an application on the device 105-125 is seen on an IP address 520 and a device fingerprint 515 with existing history. At EVENT B1, a user attempts to perform a transaction for which the server 135 identifies a different operating system (e.g., IOS) and browser (e.g., Safari) associated with the IP address 520. EVENT B1 is similar to EVENT 4 described above with respect to FIG. 5 and can be handled in a similar manner.

At EVENT B2, a new device identification token 505 is identified on the device 105-125. The server 125 determines that the device fingerprint and IP address were previously attached to the second associated PDI record, PDI-2. However, because the device fingerprints attached to the second associated PDI record, PDI-2, are both low-entropy device fingerprints, the server 135 does not assume that the device in question is the same device associated with the second PDI record, PDI-2 (e.g., the new device identification token 505 could be another user's device operating on the same connection). As a result, the server 125 assigns a third associated PDI record, PDI-3. In some implementations, it is possible for the server 135 to identify the device with the new device identification token 505 as a known device based on account and user behavior patterns (e.g., typing rates, accelerometer, time of day, etc.).

FIG. 7 illustrates a scenario 600 where PDI is used to maintain device identification across multiple browsers interacting from the same device 105-125. At EVENT C1, a user attempts to perform a transaction using a device having matching device attributes 705 (e.g., screen resolution, language, GPU vendor, and GPU RAM). The server 135 determines that an account 710 (e.g., jim@gmail.com) recently performed transactions from a device with the same device attributes 705, operating system/browser 715, and IP address 720. Because the IP address 720 has history from a device with matching attributes 705 and account 710, the server 135 is able to attach the device fingerprint 725 and device identification token 730 to an associated PDI record, PDI-1. In such an implementation, the associated PDI record, PDI-1, can be associated with multiple browser families (e.g., Firefox, Chrome, etc.).

The API and/or server 135 is configured to identify a PDI for a requests based on, for example, the use of one or more scope restrictors. Scope restrictors are used to limit the number of potential PDI records that may be associated with a particular request. Scope restrictors can include, for example, device identifications, IP addresses, truncated IP addresses, browser attributes, etc.

Figure 8:
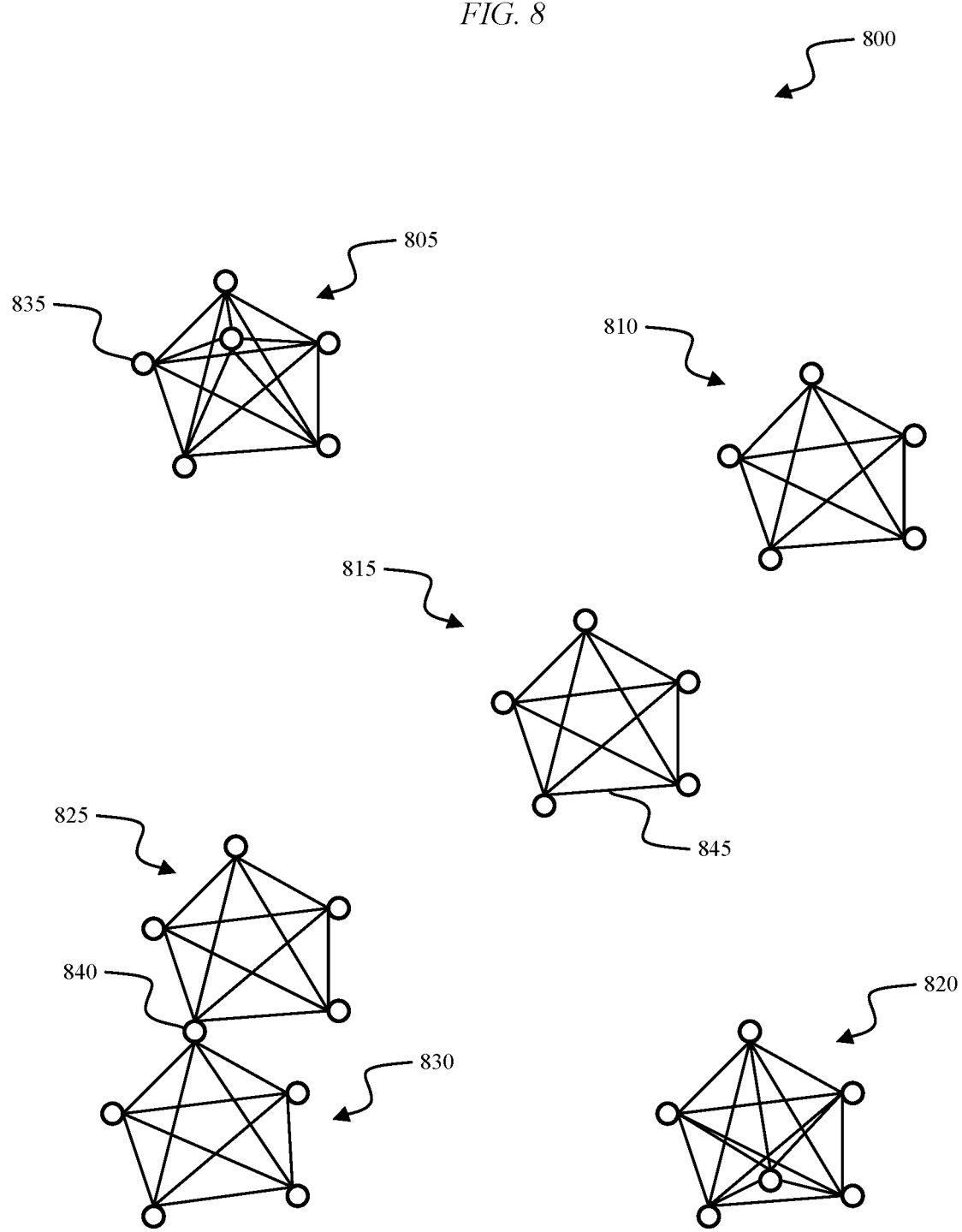
FIG. 8 illustrates IP address clusters, according to embodiments described herein.

FIG. 8 illustrates a diagram 800 of IP address clusters. The diagram 800 includes a first IP address cluster 805, a second IP address cluster 810, a third IP address cluster 815, a fourth IP address cluster 820, a fifth IP address cluster 825, and a sixth IP address cluster 830. Each of the IP address clusters 805-830 includes one or more, and often a plurality, of IP addresses that are associated with one another. IP addresses in each of the clusters 805-830 are grouped into the clusters 805-830 based on, for example, implicit account ID relationships (e.g., all IP addresses associated with a particular account ID or set of account IDs). In some embodiments, the individual IP address clusters 805-830 are operable as a device search scope restrictor because the IP address clusters 805-830 are not heavily connected to other IP address clusters. For example, in FIG. 8, only the fifth IP address cluster 825 and the sixth IP address cluster 830 are connected to one another by a common IP address 840.

In some embodiments, the individual IP address clusters 805-830 are identified by filtering out IP addresses that are heavily connected (e.g., IP aggregators). For example, from a complete listing of all available IP addresses, a number or degree is associated with each IP address (e.g., corresponding to a number of graph edges 845 adjacent to each IP address node). IP addresses having a greater degree than an IP address degree threshold (e.g., 10) are filtered out of the list of IP addresses. The IP address degree threshold can be selected achieve a desired level of restriction of remaining IP address. In some embodiments, multiple filters and IP address threshold values are used to limit the number of IP addresses in the list to an approximate ideal number (e.g., to ensure fast execution of PDI retrieval). Although the diagram 800 illustrates the IP address clusters 805-830 visually, the IP address clusters 805-830 can similarly be represented as a list where IP addresses are grouped or sorted into the clusters 805-830 based on account ID. In some embodiments, the IP address clusters are grouped based on truncated IP addresses. For example, rather than IP addresses being grouped based on a full four octet IP addresses, only the first two or three octets are used. In some embodiments, the use of truncated IP addresses is triggered when the number of related IP addresses in a cluster is small (e.g., two or fewer).

Figure 9:
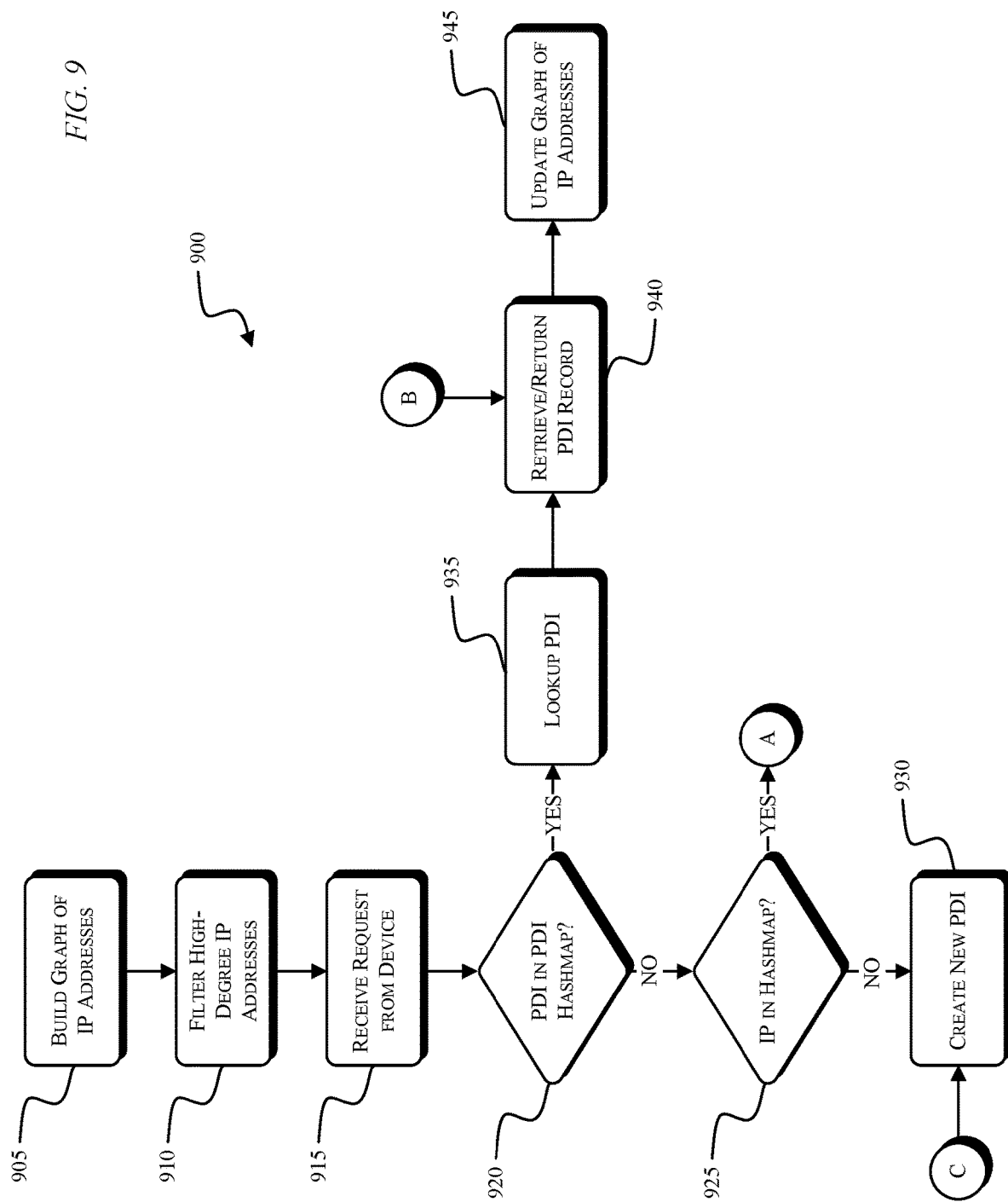
FIGS. 9, 10, and 11 are a process for retrieving and creating a PDI record, according to embodiments described herein.
Figure 10:
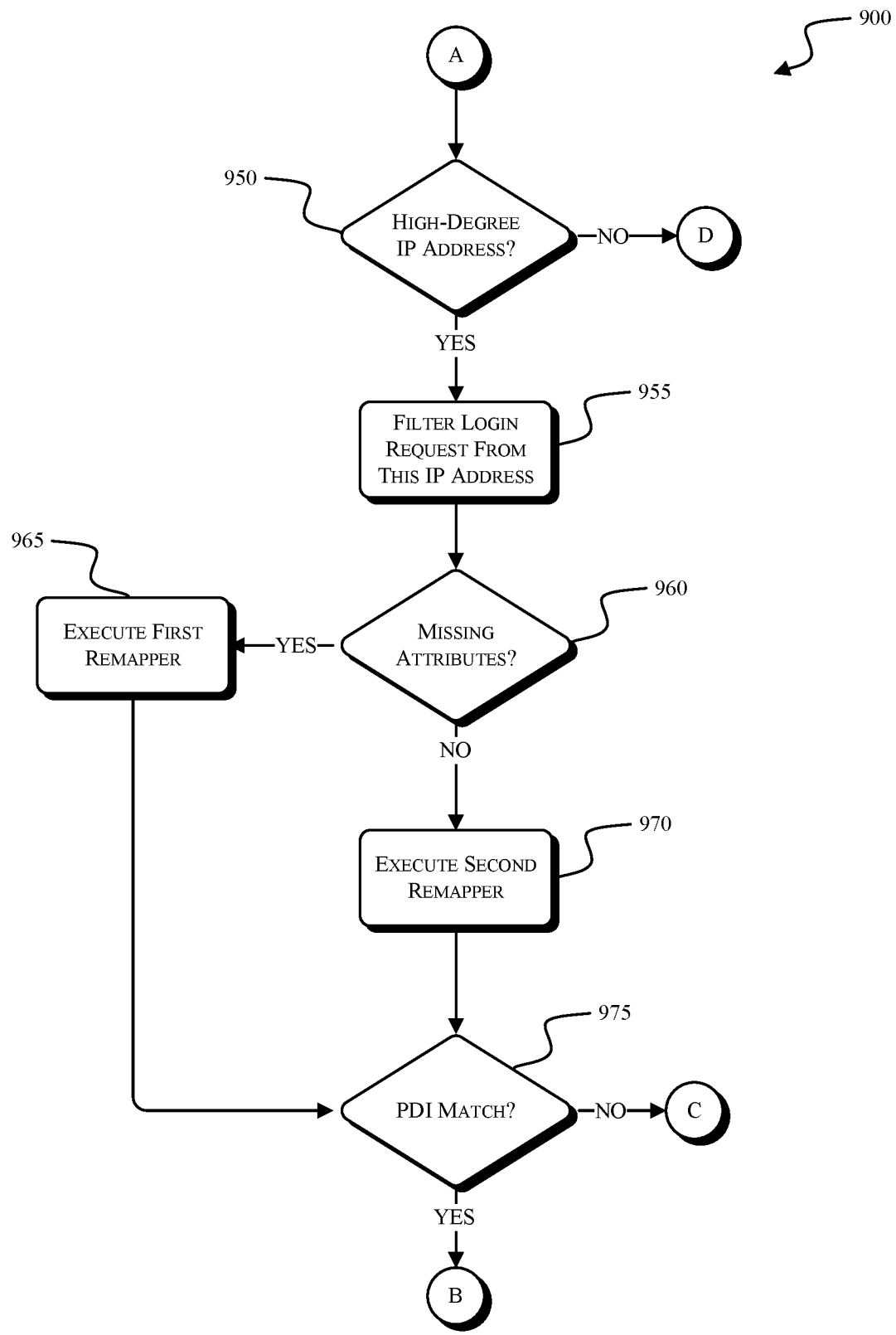
Figure 11:
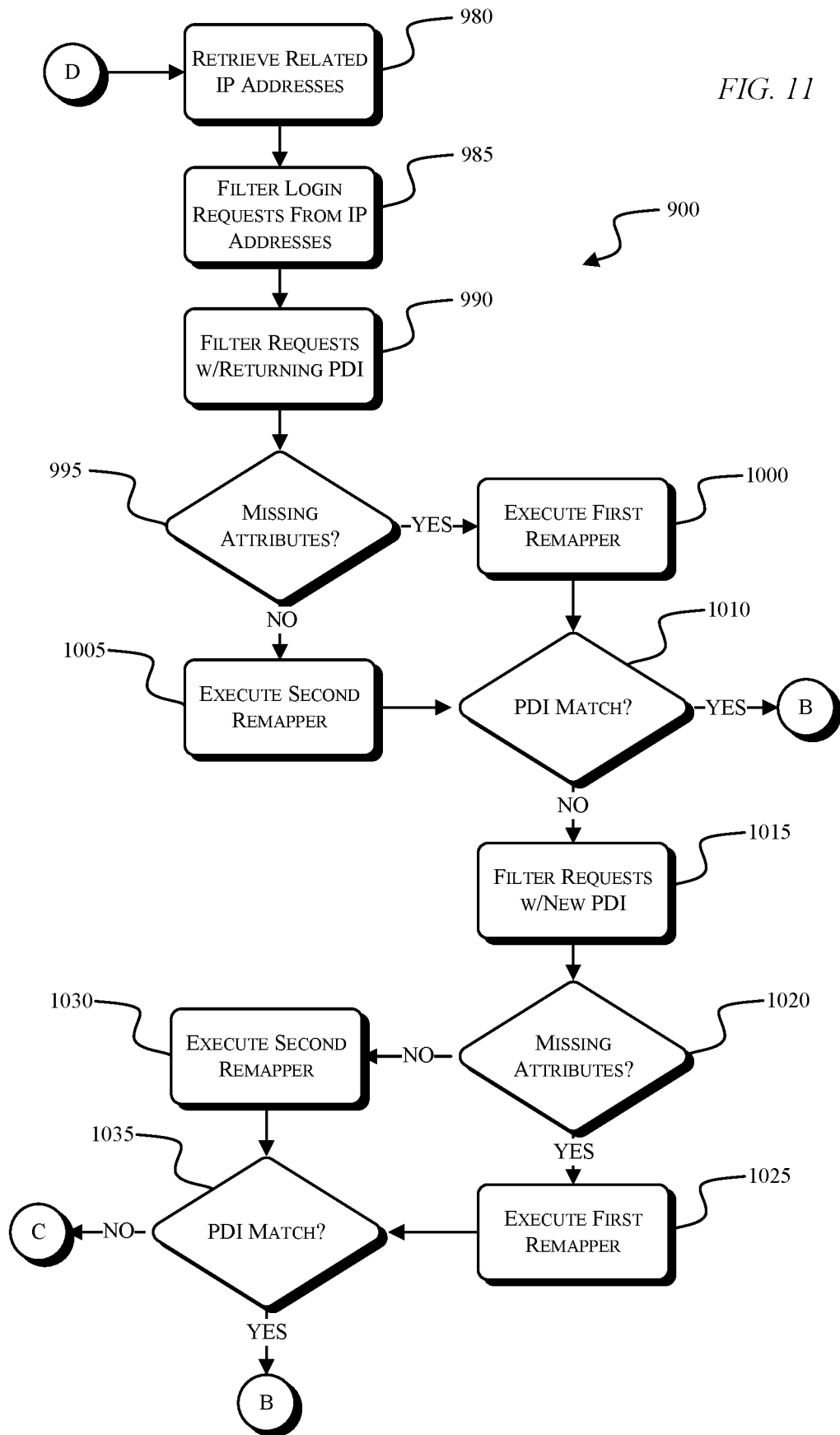

FIG. 9-11 illustrate a process 900 for retrieving and/or creating a PDI record or PDI token. The process 900 in FIGS. 9-11 is specifically described with respect to the use of the database 140 connected to the server 135 shown in FIG. 2. Although the database 140 is illustrated as being connected only to the server 135 in FIG. 2, the database 140 can be connected to any number of additional servers and the database 140 is configured for storing PDI records that can be accessed by any server connected to the database 140. By storing all of the PDI records in the database 140, uniformity and consistency can be achieved across, for example, multiple regions, multiple site domains, multiple client domains, etc. (i.e., a generated PDI record is not specific to a particular geographic region). For illustrative purposes, the process 900, as well as other processes described herein, are described with respect to the server 135 and the database 140 as specifically shown in FIG. 2.

Although the process 900 is illustrated and described in a sequential, step-wise manner, it is possible for the server 135 or API to perform the illustrated steps in a different order than the particular, exemplary order shown in and described with respect to FIGS. 9-11. With reference to FIG. 9, the process 900 begins with the server 135 building a graph of IP addresses (STEP 905). The graph of IP addresses is built or constructed based on historical data stored in the database 140. For example, IP addresses from all or a subset of previously analyzed requests are retrieved and used to construct the graph of IP addresses. After the graph has been constructed, the IP addresses included in the graph can be filtered to reduce the number of IP addresses in the graph (e.g., reduced complexity and interconnection) (STEP 910). In some embodiments, the IP addresses that are used to build the graph of IP addresses is filtered prior to and/or after the graph is created. For example, as described above with respect to FIG. 8, heavily connected IP addresses can be added to a list and filtered out of the graph. These heavily connected IP addresses often correspond to, for example, IP aggregators. Heavily connected IP addresses can be defined in order to achieve a desired level of restriction for the remaining IP addresses after filtering. In some embodiments, a heavily connected IP address is an IP address that is directly connected to 25 or more other IP addresses. In other embodiments, a heavily connected IP address is an IP address that is directly connected to 10 or more other IP addresses. In some embodiments, multiple IP address threshold values for identifying heavily connected IP addresses are used to limit the number of IP addresses remaining after filtering to an approximate ideal number (e.g., to ensure fast execution of PDI retrieval).

At STEP 915, a request is received by the server 135 or the API associated with the server 135 that was generated at one of the devices 105-125 (STEP 915). The request includes, for example, a PDI hashmap and an IP address hashmap. In some embodiments, the API and/or server 135 processes requests in parallel. At STEP 920, the API determines whether the request includes a PDI in the PDI hashmap. If, at STEP 920, the PDI is not in the PDI hashmap, the API determines whether the request includes an IP address in the IP hashmap (STEP 925). If the IP address is not in the IP hashmap, a new PDI and PDI record are generated and the PDI and IP address are added to respective PDI and IP hashmaps in the new PDI record (STEP 930). If the IP address is in the IP hashmap, the process 900 proceeds to control section A shown in and described with respect to FIG. 10.

If, at STEP 920, the PDI is within the PDI hashmap, the API calls the server 135 to request a PDI record from the database 140 related to the request from the one of the devices 105-125 and the API and/or server 135 performs a lookup in the database 140 for the particular PDI (STEP 935). The database 140 and server 135 then return the PDI record following a successful PDI lookup (STEP 940). After the PDI record has been retrieved, the server 135 can update the graph of IP addresses using the IP address hashmap from the request (STEP 945). In some embodiments, the graph of IP addresses is updated with each new request. In other embodiments, updates to the graph of IP addresses are queued in a pending list (e.g., by account ID and IP address) and the graph is updated at a later time. For example, updating the graph of IP addresses can be computationally expensive. As a result, it may be beneficial to update the graph of IP addresses during low-volume periods of the day (e.g., after midnight). In some embodiments, the graph of IP addresses is updated every N requests. For example, a value for N can be set based on average time between logins for the same IP address for device identification.

With reference to FIG. 10 and control section A, the server 135 determines whether the IP address in the IP address hashmap is a high-degree or heavily-connected IP address (STEP 950). For example, the IP address is compared against the list of heavily-connected IP addresses. If the IP address is not a high-degree IP address, the process 900 proceeds to control section D shown in and described with respect to FIG. 11. If the IP address is a high-degree IP address, login requests from the IP address are filtered (STEP 955). In some embodiments, the login requests are filtered on the condition that an operating system and browser are of the same family (e.g., Windows or IOS) and the browser versions are either the same or within a preset number of versions (e.g., the previous version). In some embodiments, a day range restrictor can also be applied to limit the filtered requests from the IP address to those within a predetermined time period (e.g., one week, one month, etc.). The server 135 then determines whether the current request from the IP address is missing any attributes (e.g., device identification token, device fingerprint, user agent, operating system attributes, browser attributes, network attributes, account ID, location, time of day, etc.). If any attributes are missing, a server 135 is configured to execute a first remapper program (e.g., a user agent based remapper program) to match the request to a PDI (STEP 965). If no attributes are missing at STEP 960, the API and/or server 135 is configured to execute a second remapper program (e.g., an attribute-based remapper program) (STEP 970). For example, the remapper program collects IP address history (e.g., when operating system and browser are of the same family and version) and applies a configurable day range restrictor (e.g., three days). At STEP 1975, the API and/or server 135 determines whether a PDI match was found following the execution of the first remapper program or second remapper program. If a PDI match was found at STEP 975, the process 900 proceeds to control section B shown in and described with respect to FIG. 9 where the matched PDI record is returned (STEP 940). If no PDI match was found at STEP 975, the process 900 proceeds to control section C shown in and described with respect to FIG. 9 where a new PDI and PDI record are generated and the PDI and IP address are added to respective PDI and IP hashmaps in the new PDI record (STEP 930).

With reference to FIG. 11 and control section D, the API and/or server 135 retrieves a list or set of related IP address from the graph of IP addresses (e.g., direct neighbors of the current request's IP address) (STEP 980). After the related IP addresses have been identified, the API and/or server 135 filters the login requests from the current request's IP address and all of the related IP addresses (e.g., related by account ID) (STEP 985). In some embodiments, the login requests are filtered on the condition that an operating system and browser are of the same family (e.g., Windows or IOS) and the browser versions are either the same or within a preset number of versions (e.g., the previous version). In some embodiments, a day range restrictor can also be applied to limit the filtered requests from the IP address to those within a predetermined time period (e.g., one week, one month, etc.). The API and/or server 135 then filters the remaining requests that include returning and/or that were previously remapped (STEP 990). The API and/or server 135 then determines whether any of the filtered requests are missing any attributes (e.g., device identification token, device fingerprint, user agent, operating system attributes, browser attributes, network attributes, account ID, location, time of day, etc.) (STEP 995). If any of the requests are missing attributes, API and/or server 135 is configured to execute a first remapper program for those requests (e.g., a user agent based remapper program) to match the request to a PDI (STEP 1000). If any of the requests are not missing attributes at STEP 960, the API and/or server 135 is configured to execute a second remapper program on those requests (e.g., an attribute-based remapper program) (STEP 1005). For example, the remapper program collects IP address history (e.g., when operating system and browser are of the same family and version) and applies a configurable day range restrictor (e.g., three days). At STEP 1010, the API and/or server 135 determines whether a PDI match was found following the execution of the first remapper program or second remapper program. If a PDI match was found at STEP 1010, the process 900 proceeds to control section B shown in and described with respect to FIG. 9 where the matched PDI record is returned (STEP 940). In some embodiments, the API and/or the server 135 is configured to reassign a PDI of one or more of the related IP addresses following the STEP 1010 (i.e., reassigning the IP addresses to the matched PDI).

If no PDI match was found at STEP 1010, the API and/or server 135 then filters the remaining requests after STEP 985 that include new PDIs (STEP 1015). In some embodiments, if no matching requests that include new PDIs are returned, the API and/or server 135 expands the scope of the search by truncating the IP address of the current request (e.g., using the first two or three octets of the IP address). The API and/or server 135 then determines whether any of the filtered requests are missing any attributes (e.g., device identification token, device fingerprint, user agent, operating system attributes, browser attributes, network attributes, account ID, location, time of day, etc.) (STEP 1020). If any of the requests are missing attributes, API and/or server 135 is configured to execute a first remapper program for those requests (e.g., a user agent based remapper program) to match the request to a PDI (STEP 1025). If any of the requests are not missing attributes at STEP 1020, the API and/or server 135 is configured to execute a second remapper program on those requests (e.g., an attribute-based remapper program) (STEP 1030). For example, the remapper program collects IP address history (e.g., when operating system and browser are of the same family and version) and applies a configurable day range restrictor (e.g., three days). At STEP 1035, the API and/or server 135 determines whether a PDI match was found following the execution of the first remapper program or second remapper program. If a PDI match was found at STEP 1035, the process 900 proceeds to control section B shown in and described with respect to FIG. 9 where the matched PDI record is returned (STEP 940). If no PDI match was found at STEP 1035, the process 900 proceeds to control section C shown in and described with respect to FIG. 9 where a new PDI and PDI record are generated and the PDI and IP address are added to respective PDI and IP hashmaps in the new PDI record (STEP 930).

Figure 12:
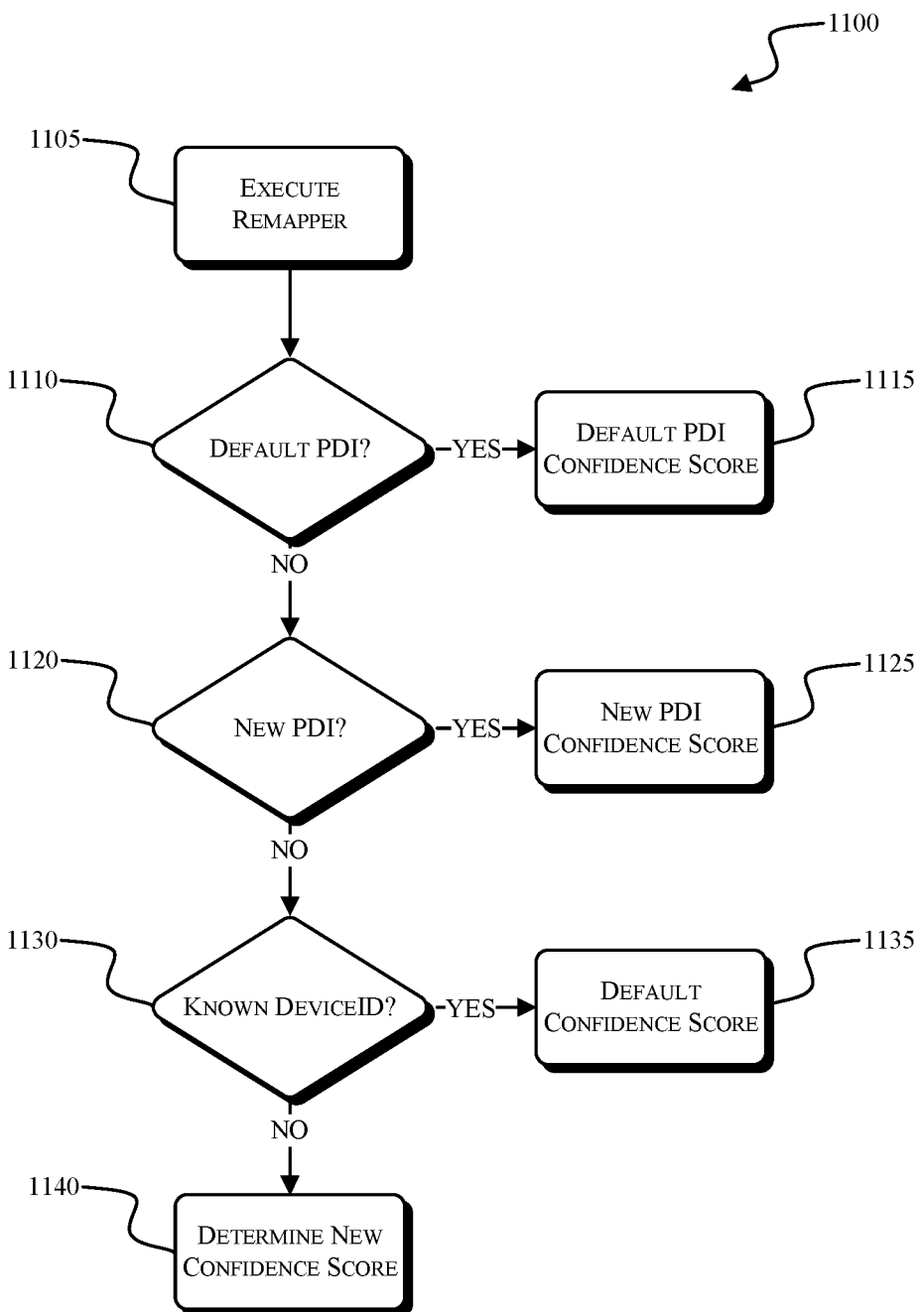
FIG. 12 is a process for determining a confidence score associated with PDI remapping, according to embodiments described herein.

When remapping using, for example, any of the remapper programs described herein to attempt to identify a matching PDI, the API and/or the server 135 assigns a confidence score to candidate PDIs. The higher the confidence score, the more likely that the matched PDI is correctly matched to the request. FIG. 12 illustrates a process 1100 for assigning confidence scores to candidate PDIs after remapping. At STEP 1105, the API and/or server 135 executes a remapper program (e.g., the user agent-based or attribute based remapper programs described above). There are three primary results that come from the remapper program. The results include producing a default PDI, producing a new PDI, or matching a known PDI.

If the remapper program is executed and the result of the remapper program is a default PDI (STEP 1110) (see, e.g., STEP 1515 of process 1500), the default PDI is assigned a PDI population probability as a confidence score (STEP 1115). Because the default PDI has only one associated record (i.e., is not based on changed attributes), the confidence score for the default PDI is the population probability associated with the default PDI (e.g., the number of requests assigned the default PDI divided by the number total number of requests). Similarly, if no default PDI was created but a new PDI was created (STEP 1120), the new PDI is assigned a PDI population probability for the new PDI as a confidence score (STEP 1125). Because the new PDI also has only one associated record (i.e., is not based on changed attributes), the confidence score for the new PDI is the population probability associated with the new PDI (e.g., the number of requests that received a new PDI divided by the number total number of requests).

Finally, if a PDI was matched by the remapper program, the API and/or server 135 determines whether the matched PDI has a known deviceID associated with it (e.g., for device 105-125) (STEP 1130). If the matched PDI has a known deviceID, the PDI is given a default confidence score (e.g., 0.99) (STEP 1135). However, if the matched PDI does not have a known deviceID the API and/or server 135 calculates or determines a confidence score for the matched PDI (STEP 1140). In some embodiments, the API and/or server 135 uses Bayes Theorem to calculate a remapping confidence score. For example, the remapping confidence score can be determined based on the probability of an attribute changing, staying the same, being missing, and being invalid. Such a determination can further include, for example, the probability of successful remapping. In other embodiments, an average of weighted posteriori probabilities is used to calculate a remapping confidence score. For example, the weighted posteriori probabilities assigns a weight to specific attributes (e.g., based on impact of the attributes presence) and the probability that the attributes were changed, stayed the same, were missing, or were invalid. In some embodiments, an attributes change rate posteriori probability (e.g., number of changed attributes compared to number of attributes) is used to determine a remapping confidence score. In some embodiments, metrics are used to evaluate the quality or performance of remapper matching. For example, evaluation metrics can include, average longevity of PDIs, median longevity of PDIs, proportion of valid PDIs, proportion of default PDIs, unique PDIs, deviceIDs, etc., in the dataset, dataset time range, and the like.

Figure 13:
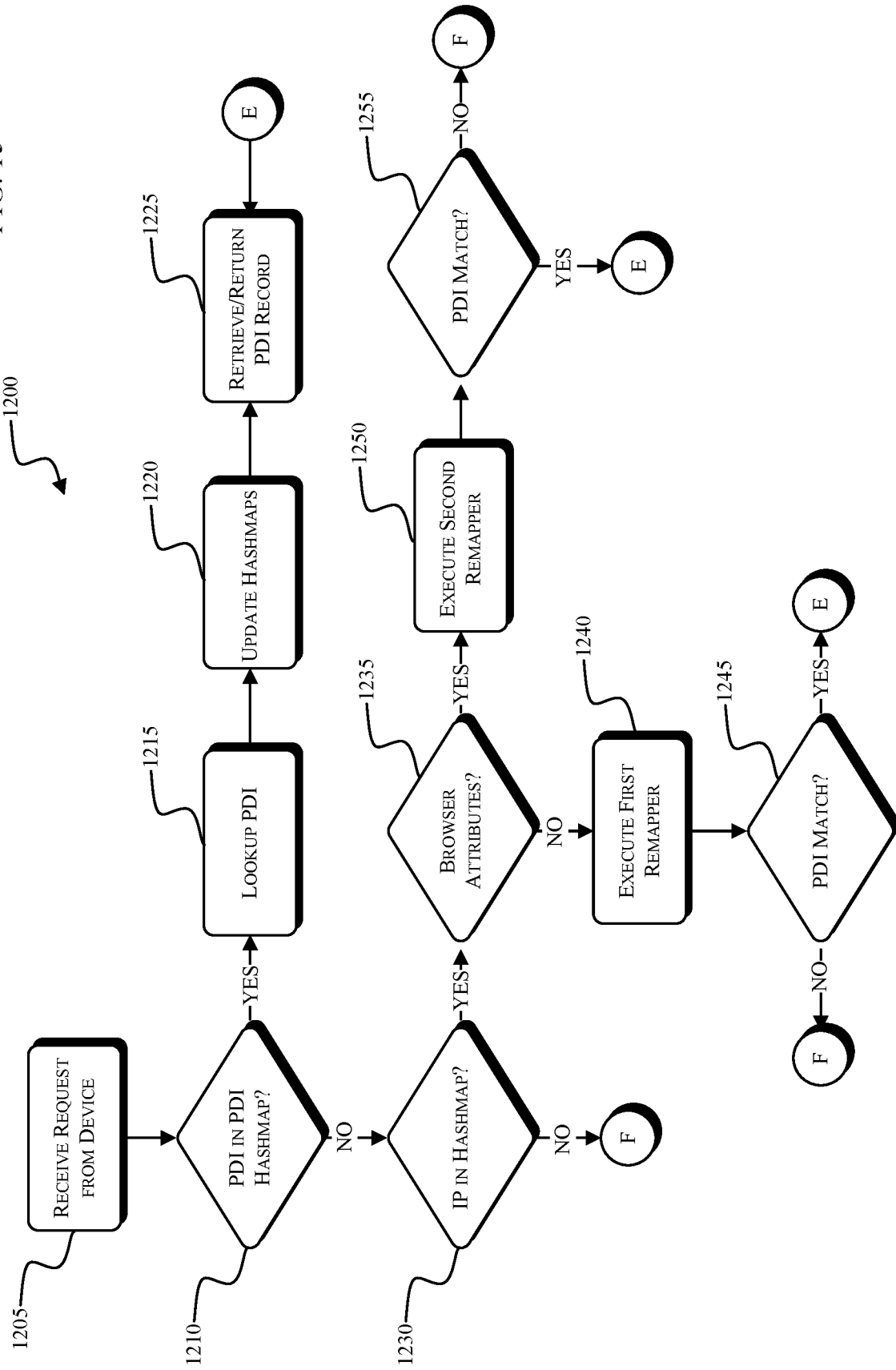
FIGS. 13, 14, and 15 are a process for retrieving and creating a PDI record, according to embodiments described herein.
Figure 14:
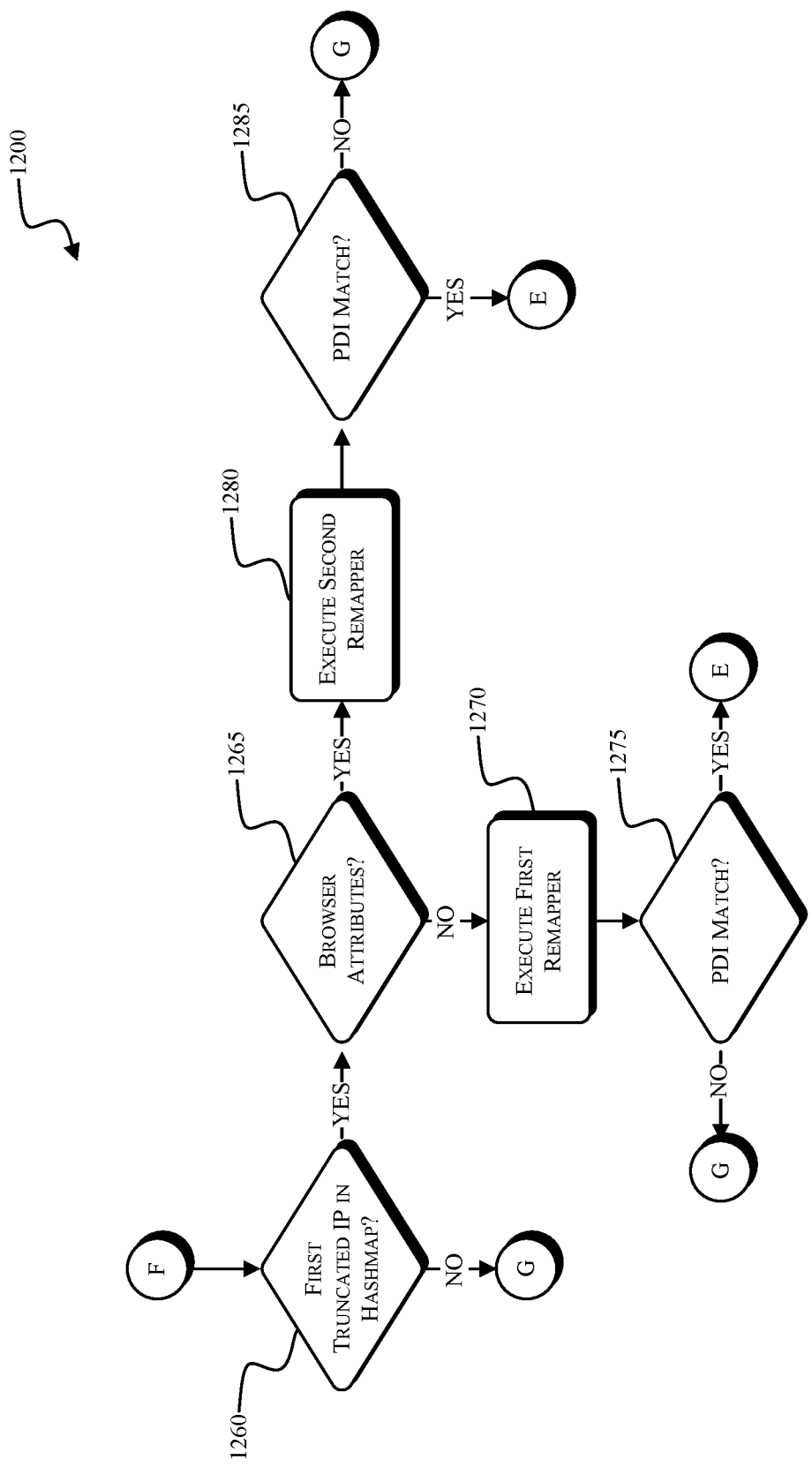
Figure 15:
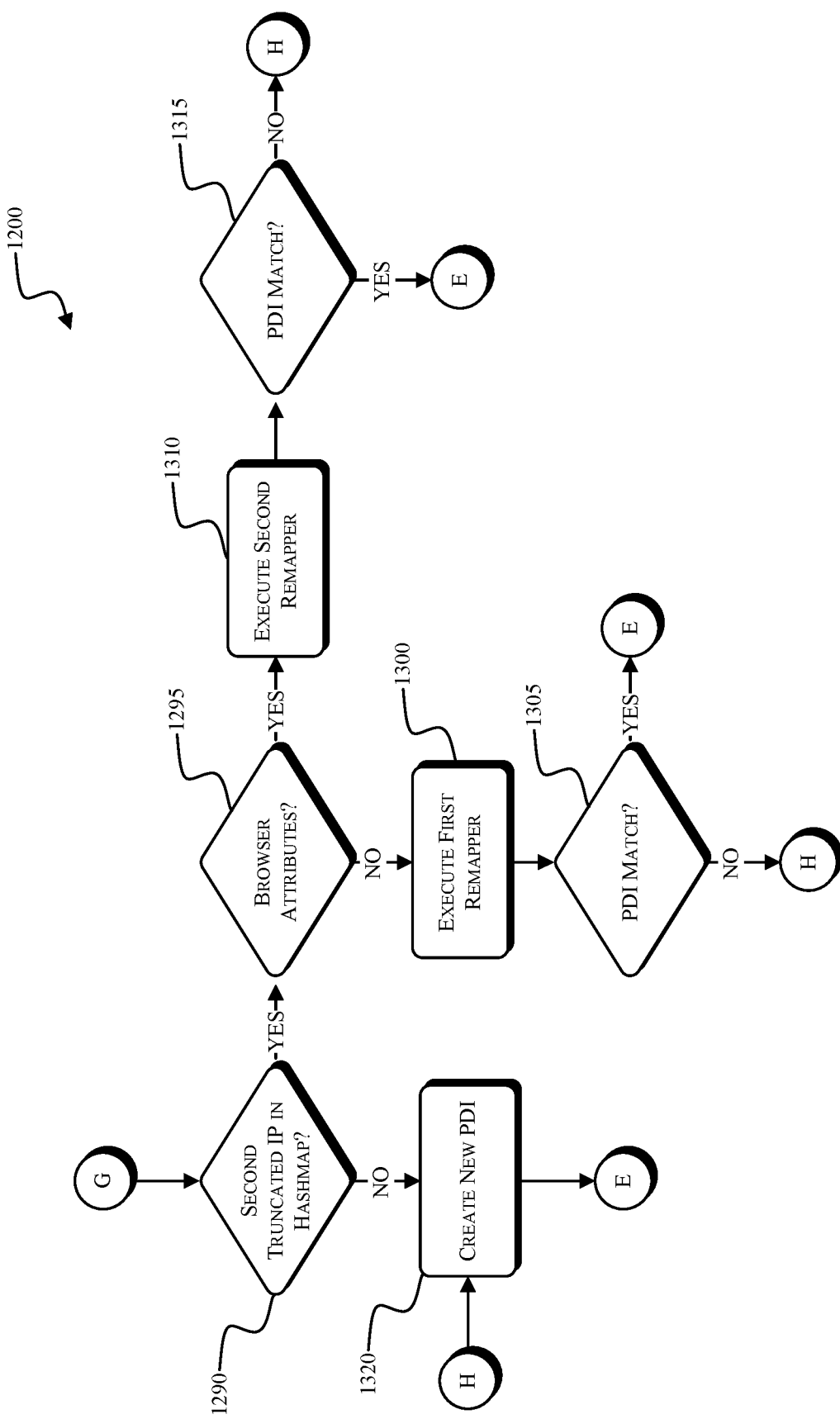

FIGS. 13-15 illustrate another process 1200 for retrieving and/or creating a PDI record or PDI token. Although the process 1200 is illustrated and described in a sequential, step-wise manner, it is possible for the server 135 or API to perform the illustrated steps in a different order than the particular, exemplary order shown in and described with respect to FIGS. 13-15. With reference to FIG. 13, the process 1200 begins with a request being generated at one of the devices 105-125 that is transmitted to the server 135 or the API associated with the server 135 (STEP 1205). The request includes, for example, a PDI hashmap, an IP address hashmap, a first truncated IP address, and a second truncated IP address. In some embodiments, other scope restrictors are used, such as user agent, application version number, connection type, etc. Unlike, for example, the process 1400 shown in and described with respect to FIG. 16, which uses IP address as a scope restrictor, the process 1200 also includes a first truncated IP address and a second truncated IP address as additional scope restrictors. The use of truncated IP addresses as scope restrictors is, for example, particularly beneficial with respect to mobile devices that experience regular fluctuations in IP address (e.g., based on changing locations).

At STEP 1210, the API determines whether the request includes a PDI in the PDI hashmap. If, at STEP 1210, the PDI is within the PDI hashmap, the API calls the server 135 to request a PDI record from the database 140 related to the request from the one of the devices 105-125 and the server 135 performs a lookup in the database 140 for the particular PDI (STEP 1215). The PDI and IP address hashmaps are updated (STEP 1220), and the database 140 and server 135 return the PDI record following a successful PDI lookup (STEP 1225). If, at STEP 1210, the PDI is not in the PDI hashmap, the API determines whether the request includes an IP address in the IP hashmap (STEP 1230). If the IP address is not in the IP hashmap, the process 1200 proceeds to control section F shown in and described with respect to FIG. 14. If the IP address is in the IP hashmap, the API determines whether the request includes browser attributes (STEP 1235). If the request does not include browser attributes, a first remapper program (e.g., a user agent based remapper program) is executed to match the request to a PDI (STEP 1240). At STEP 1245, the API and/or server 135 determines whether a PDI match was found following the execution of the first remapper program. If a PDI match was found at STEP 1245, the process 1200 proceeds to control section E where the matched PDI record is returned (STEP 1225). If no PDI match was found at STEP 1245, the process 1200 proceeds to control section F shown in and described with respect to FIG. 14.

If, at STEP 1235, the request did include browser attributes, a second remapper program is executed (STEP 1250). The second remapper program is an attribute-based remapper program. For example, the remapper program collects IP address history (e.g., when operating system and browser are of the same family and version) and applies a configurable day range restrictor (e.g., three days). At STEP 1255, the API and/or server 135 determines whether a PDI match was found following the execution of the second remapper program. If a PDI match was found at STEP 1255, the process 1200 proceeds to control section E where the matched PDI record is returned (STEP 1225). If no PDI match was found at STEP 1255, the process 1200 proceeds to control section F shown in and described with respect to FIG. 14.

With reference to control section F of the process 1200 and FIG. 14, the API determines whether the request includes a first truncated IP address (e.g., first three octets) in the IP hashmap (STEP 1260). If the first truncated IP address is not in the IP hashmap, the process 1200 proceeds to control section G shown in and described with respect to FIG. 15. If the first truncated IP address is in the IP hashmap, the API determines whether the request includes browser attributes (STEP 1265). If the request does not include browser attributes, the first remapper program (e.g., a user agent based remapper program) is executed to match the request to a PDI (STEP 1270). At STEP 1275, the API and/or server 135 determines whether a PDI match was found following the execution of the first remapper program. If a PDI match was found at STEP 1275, the process 1200 proceeds to control section E where the matched PDI record is returned (STEP 1225). If no PDI match was found at STEP 1275, the process 1200 proceeds to control section G shown in and described with respect to FIG. 15.

If, at STEP 1265, the request did include browser attributes, the second remapper program is executed (STEP 1780). The second remapper program is an attribute-based remapper program. For example, the remapper program collects IP address history (e.g., when operating system and browser are of the same family and version) and applies a configurable day range restrictor (e.g., three days). At STEP 1285, the API and/or server 135 determines whether a PDI match was found following the execution of the second remapper program. If a PDI match was found at STEP 1285, the process 1200 proceeds to control section E where the matched PDI record is returned (STEP 1225). If no PDI match was found at STEP 1285, the process 1200 proceeds to control section G shown in and described with respect to FIG. 15.

With reference to control section G of the process 1200 and FIG. 15, the API determines whether the request includes a second truncated IP address (e.g., first two octets) in the IP hashmap (STEP 1290). If the second truncated IP address is in the IP hashmap, the API determines whether the request includes browser attributes (STEP 1295). If the request does not include browser attributes, the first remapper program (e.g., a user agent based remapper program) is executed to match the request to a PDI (STEP 1300). At STEP 1305, the API and/or server 135 determines whether a PDI match was found following the execution of the first remapper program. If a PDI match was found at STEP 1305, the process 1200 proceeds to control section E where the matched PDI record is returned (STEP 1225). If no PDI match was found at STEP 1305, the process 1200 proceeds to control section H.

If, at STEP 1295, the request did include browser attributes, the second remapper program is executed (STEP 1310). The second remapper program is an attribute-based remapper program. For example, the remapper program collects IP address history (e.g., when operating system and browser are of the same family and version) and applies a configurable day range restrictor (e.g., three days). At STEP 1315, the API and/or server 135 determines whether a PDI match was found following the execution of the second remapper program. If a PDI match was found at STEP 1315, the process 1200 proceeds to control section E where the matched PDI record is returned (STEP 1225). If no PDI match was found at STEP 1315, the process 1200 proceeds to control section H. If, at STEP 1290, the second truncated IP address is not in the IP hashmap, a new PDI and PDI record are generated and the PDI and IP address are added to respective PDI and IP hashmaps in the new PDI record (STEP 1320). The process 1200 then proceeds to control section E where the new PDI record is returned (STEP 1225).

Figure 16:
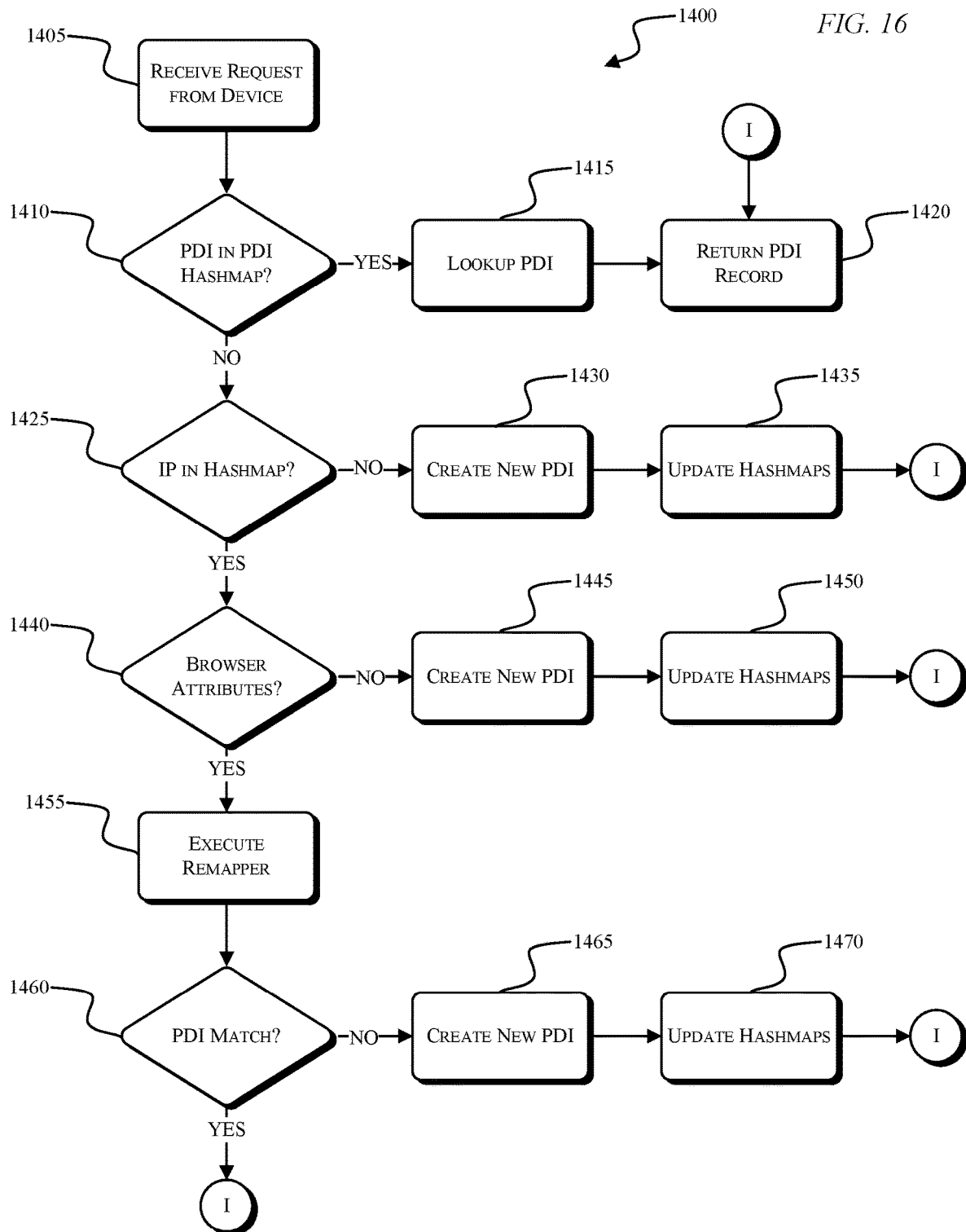
FIG. 16 is a process for retrieving and creating a PDI record, according to embodiments described herein.
Figure 17:
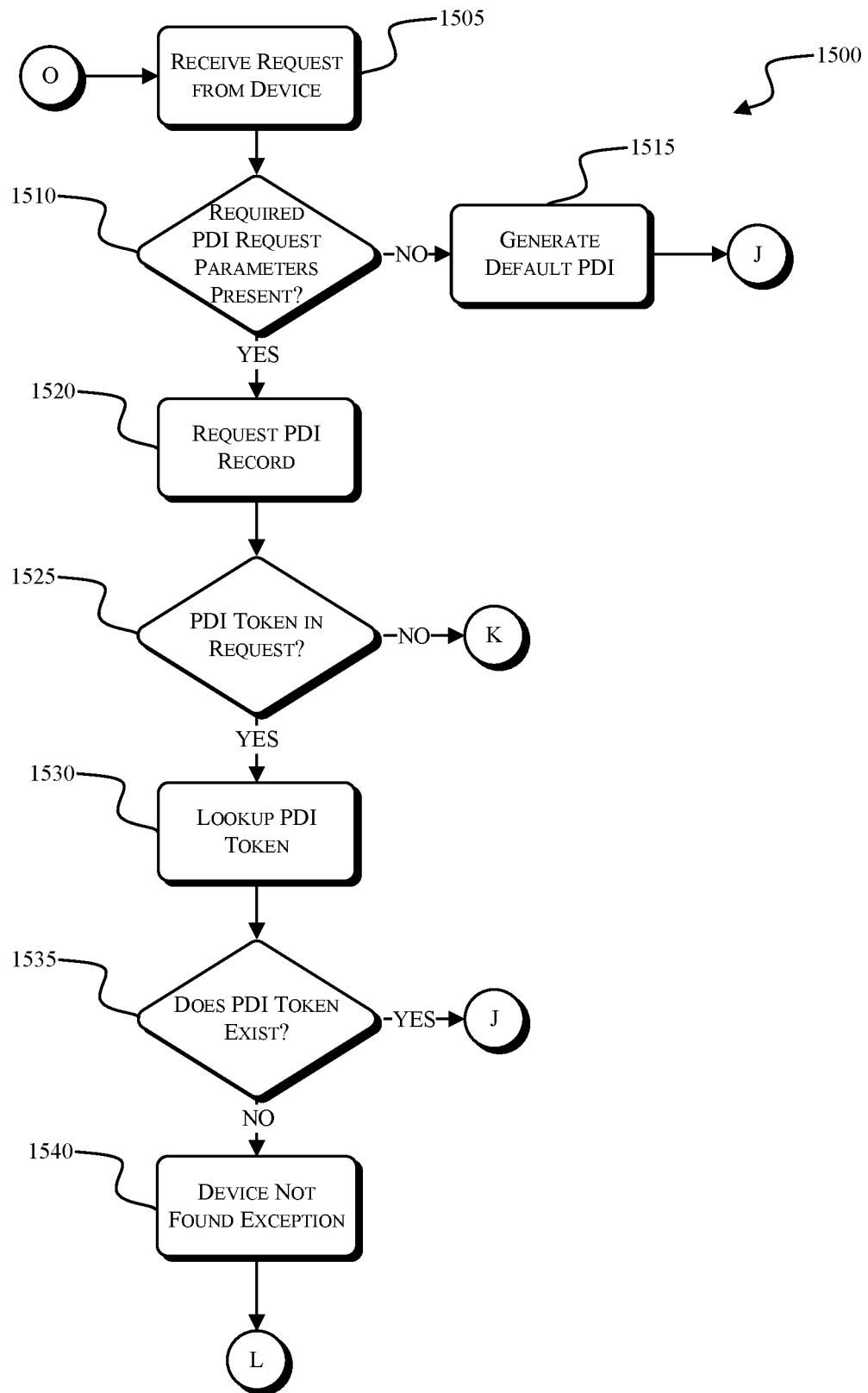
FIGS. 17, 18, 19, 20 are a process for retrieving and creating a PDI record, according to embodiments described herein.

FIG. 16 illustrates another process 1400 for retrieving and/or creating a PDI record or PDI token. Although the process 1400 is illustrated and described in a sequential, step-wise manner, it is possible for the server 135 or API to perform the illustrated steps in a different order than the particular, exemplary order shown in and described with respect to FIG. 16. With reference to FIG. 16, the process 1400 begins with a request being generated at one of the devices 105-125 that is transmitted to the server 135 or the API associated with the server 135 (STEP 1405). The request includes, for example, a PDI hashmap and an IP address hashmap, which can be used as a scope restrictor when attempting to identify a related PDI. In some embodiments, other scope restrictors are used, such as user agent, application version number, connection type, etc. At STEP 1410, the API determines whether the request includes a PDI in the PDI hashmap. If, at STEP 1410, the PDI is within the PDI hashmap, the API calls the server 135 to request a PDI record from the database 140 related to the request from one of the devices 105-125 and the server 135 performs a lookup in the database 140 for the particular PDI (STEP 1415). The database 140 and server 135 return the PDI record following a successful PDI lookup (STEP 1420).

If, at STEP 1410, the PDI is not in the PDI hashmap, the API determines whether the request includes an IP address in the IP hashmap (STEP 1425). If the IP address is not in the IP hashmap, a new PDI and PDI record are generated (STEP 1430), and the PDI and IP address are added to respective PDI and IP hashmaps in the new PDI record (STEP 1435). The process 1400 then proceeds to control section I where the new PDI record is returned. If, at STEP 1425, the IP address is in the IP hashmap, the API determines whether the request includes browser attributes (STEP 1440). If the request does not include browser attributes, a new PDI and PDI record are generated (STEP 1445), and the PDI and IP address are added to respective PDI and IP hashmaps in the new PDI record (STEP 1450). The process 1400 then proceeds to control section I where the new PDI record is returned. If, at STEP 1440, the request includes browser attributes, an attributes-based remapper or remapping program is executed (STEP 1455). The remapper program uses attributes associated with the request (e.g., account ID, historical events, etc.) in a final attempt to identify a PDI record associated with the request. In some embodiments, the remapper program determines a related confidence score for a matched PDI based on a number of changes that exist for attributes. In other embodiments, the remapper program determines the related confidence score for a matched PDI based on what attributes have changed. Confidence scoring is described in greater detail above (see FIG. 12). An account ID remapping program is described below, for example, with respect to STEPS 1565-1585 of process 1500. After the remapping program or remapper is executed, the API or the server 135 determines whether a matching PDI was identified (STEP 1460). If, at STEP 1460, no PDI matched, a new PDI and PDI record are generated (STEP 1465), and the PDI and IP address are added to respective PDI and IP hashmaps in the new PDI record (STEP 1470). The process 1400 then proceeds to control section I where the new PDI record is returned. If, at STEP 1460, a PDI was matched, the process 1400 proceeds to control section I where the matched PDI record is returned.

FIGS. 17-20 illustrate another process 1500 for retrieving and/or creating a PDI record. The process 1500 begins with, for example, a request being generated at one of the devices 105-125 that is transmitted to the API associated with the server 135 (STEP 1505). At STEP 1510, the API determines whether the request includes appropriate PDI request parameters. For example, the PDI request parameters can include particular headers that are required to lookup a PDI or PDI token. If, at STEP 1510, the PDI request parameters are not present, the API generates a default PDI token and record (STEP 1515). The process 1500 then proceeds to control section J shown in and described with respect to FIG. 19. If the PDI request parameters are present, the API calls the server 135 to request a PDI record from the database 140 related to the request from the one of the devices 105-125 (STEP 1520).

At STEP 1525, the server 135 determines whether a particular PDI token was provided in the request. If the request did not include a particular PDI token, the process 1500 proceeds to control section K shown in and described with respect to FIG. 18. If the request did include a particular PDI token, the server 135 performs a lookup in the database 140 for the particular PDI token (STEP 1530). If the PDI token lookup in the database 140 was successful and the particular PDI record exists, the process 1500 proceeds to control section J shown in and described with respect to FIG. 19. If the PDI token lookup in the database 140 was not successful, the server 135 receives a device not found exception (STEP 1540), and the process 1500 proceeds to control section L shown in and described with respect to FIG. 18. In some embodiments, the server 135 communicates a lookup request to an API for the database 140 and the API for the database 140 returns either the PDI record or the device not found exception to the server 135.

Figure 18:
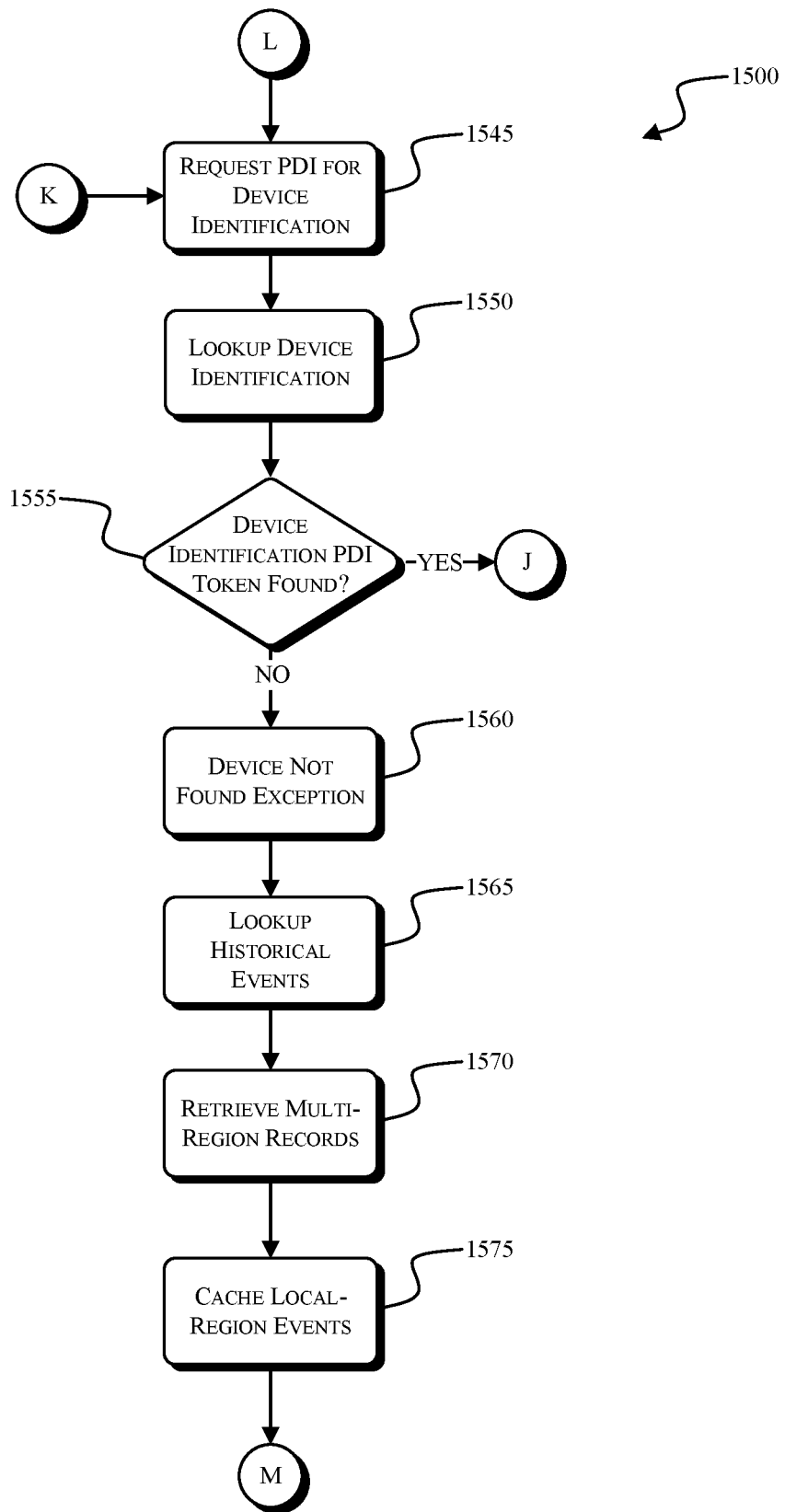

With reference to FIG. 18 and control section L of the process 1500, the server 135 requests a PDI record based on device identification information (e.g., device fingerprint attributes, device connection information, etc.) (STEP 1545). The server 135 performs a lookup in the database 140 for a PDI token based on the device identification information (STEP 1550). If, at STEP 1555, the PDI token lookup in the database 140 was successful and a PDI record is identified based on the device identification information, the process 1500 proceeds to control section J shown in and described with respect to FIG. 19. If the PDI token lookup in the database 140 was not successful, the server 135 receives a device not found exception (STEP 1560).

If the device not found exception was returned to the server 135 at STEP 1560, the server 135 performs a lookup of historical events associated with an account (STEP 1565). In some embodiments, the lookup of historical events associated with an account is based on an account ID that identifies a particular account. Based on, for example, the account ID, multi-region records for the account are retrieved from the database 140 (STEP 1570). The multi-region records correspond to all account records for the account for any geographical region in which a record was created. For example, a server other than the server 135 which is located in a different region than the server 135 may have created a record for the account and stored that record to the database 140. With respect to the records retrieved at STEP 1570, the server 135 or an API for the database 140 caches the local region events associated with the account ID (STEP 1575). The process 1500 then proceeds to control section M shown in and described with respect to FIG. 19.

Figure 19:
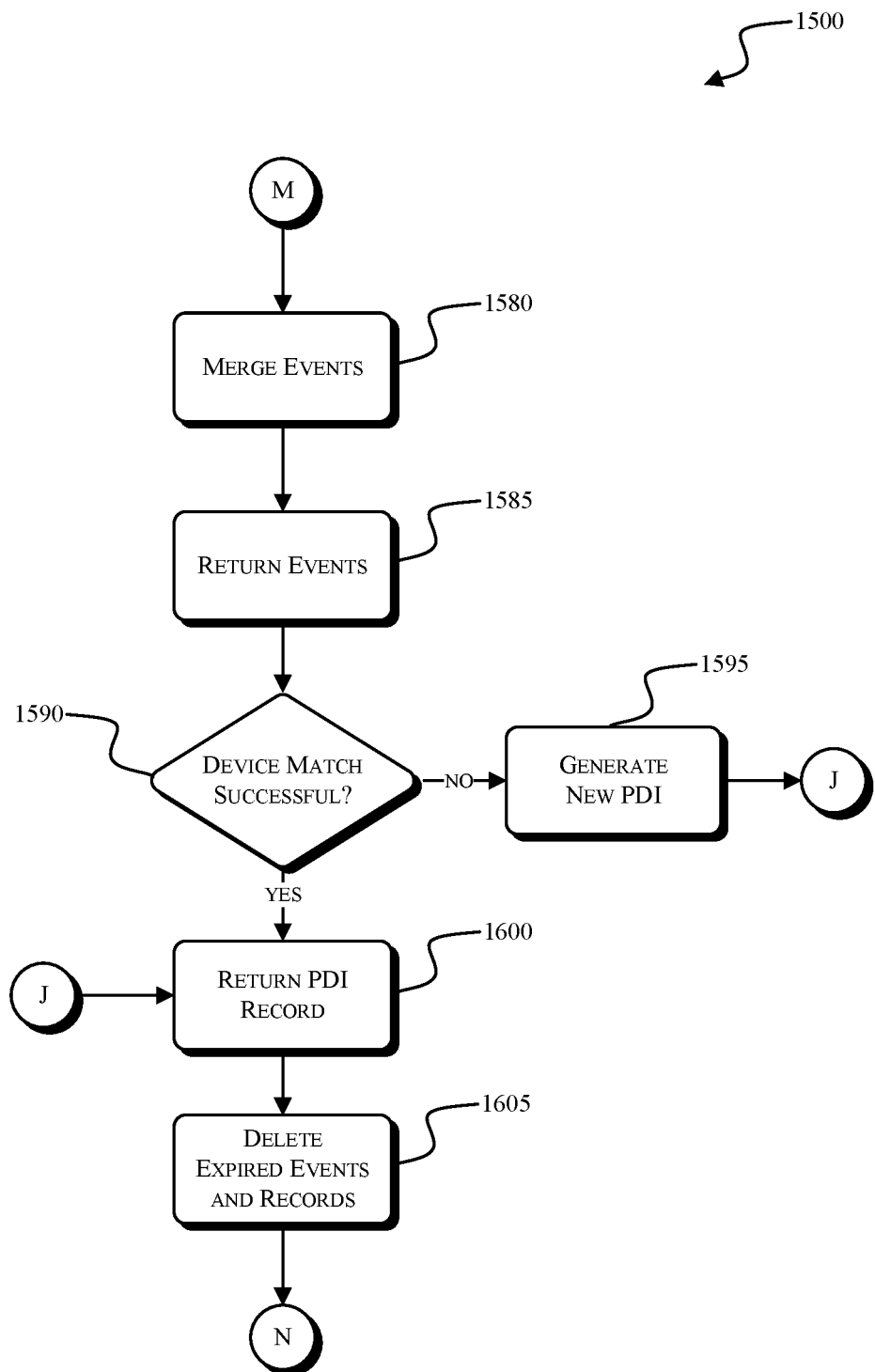

With reference to FIG. 19 and control section M of the process 1500, the server 135 or an API for the database 140 processes or merges event records from all regions, site domains, client domains, etc., for the account ID (STEP 1580). Processing or merging the records includes, for example, sorting event records, combining event records, and removing expired or duplicate data from the records. Following STEP 1580, the most recent N event records are returned from the processed or merged list of event records (STEP 1585). In some embodiments, N represents all of the event records for the account ID. In other embodiments, N is a specific number of event records (e.g., ten records) or N corresponds to a number of records in a predetermined period of time (e.g., 30 days). At STEP 1590, the server 135 or an API for the database 140 attempts to match a PDI token to the request from the client device 105-125 based on the event records. In some embodiments, a fuzzy logic matching algorithm is used to attempt to match a PDI token to the request from the client device 105-125. For example, a comparison on a 1:1 basis can be performed where the most recent preceding record for a PDI token is compared to the request. In other embodiments, a comparison on an N:1 basis is performed using distribution comparison techniques (e.g., moment matching, Kullback-Leibler divergence, etc.). If, at STEP 1590, the server 135 was unable to match a PDI token based on the event records, a new PDI token and record is generated (STEP 1595), and the process 1500 proceeds to control section J. If, at STEP 1590, the server 135 was able to match a PDI token based on the event records, the corresponding PDI record is returned (STEP 1600). In some embodiments, returning the PDI record includes returning the PDI record as well as one or more pieces of additional information or data. The one or more pieces of additional information or data can include timestamps for when the first and last instances of the PDI record were recorded in the database 140. The PDI record is returned, for example, to the server 135 from the database 140 or an API for the database 140. The server 135, in turn, returns the PDI to the API associated with the server 135. If, for example, the request from the device 105-125 was related to a login attempt, successfully returning the PDI record causes the API associated with the server 135 to permit the device 105-125 to successfully login to a server application. In some embodiments, if no PDI record was returned and a new PDI token and record was generated at STEP 1595 based on historical events or information, the server 135 can mark the newly created PDI record as suspicious.

Figure 20:
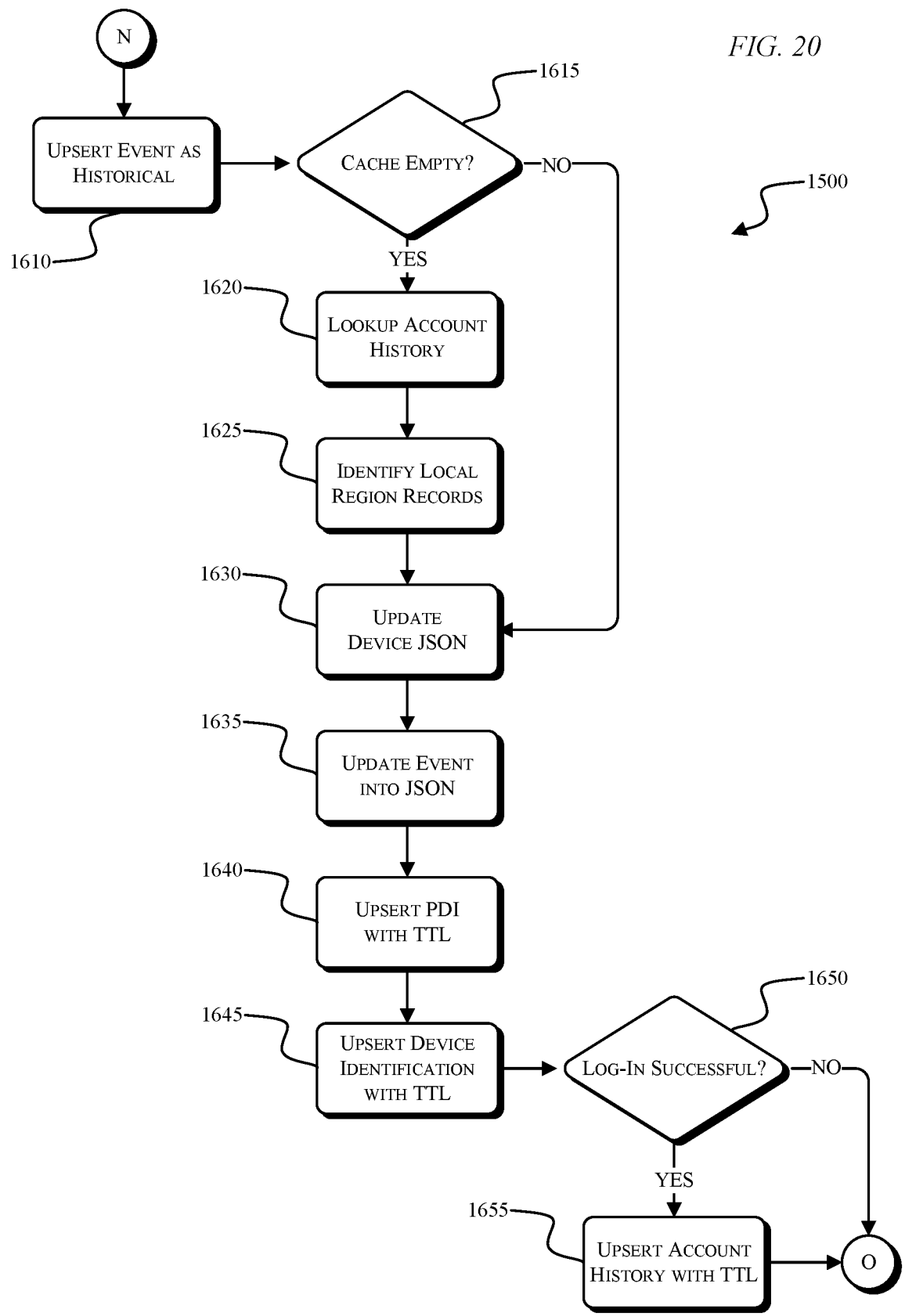

Following STEP 1600, the server 135 or an API for the database 140 can delete or clear expired or duplicate data from the records from the account ID historical record (STEP 1605). The process 1500 then proceeds to control section N shown in and described with respect to FIG. 20. With reference to FIG. 20 and control section N of the process 1500, the server 135 or an API for the database 140 upserts the updated history for the account ID and PDI record including the most recent event from the device 105-125 (e.g., a login attempt) (STEP 1610). If, as part of the upsert, the database 140 or an API for the database 140 determines that an upserted events cache for the account ID is empty at STEP 1615, the database 140 or an API for the database 140 performs and account history lookup to retrieve the multi-region records associated with the account ID (STEP 1620). The database 140 or an API for the database 140 then identifies local region event records for the account ID (STEP 1625). A Java Script Object Notation ("JSON") is updated for the device 105-125 (STEP 1630), which can include updating last seen timestamps for the PDI record, the device identification information, and the account ID. If the upserted events cache for the account ID is not empty at STEP 1615, the process 1500 proceeds to 1630. The JSON is then updated with the most recent event (e.g., a login attempt) (STEP 1635). For example, local region event records for the account ID are processed to update the event record device data. The event record can then be merged and sorted, event record limits can be maintained (e.g., by deleting the first seen event record), and any expired or duplicate data can be removed.

Following STEP 1635, the database 140 or an API for the database 140 upserts a PDI lookup family record with a configured time-to-live ("TTL") for data retention (STEP 1640), and the database 140 or an API for the database 140 upserts a device identification information lookup family record with a configured TTL for data retention (STEP 1645). In some embodiments, a lookup family record is a subset of a PDI record that includes lookup information that can be used to match future requests to the PDI record. If the result of the request from the device 105-125 was successful (e.g., a successful login attempt) (STEP 1650), the database 140 or an API for the database 140 also upserts an account history family record with configured TTL for data retention (STEP 1655). The process 1500 then proceeds to control section O shown in and described with respect to FIG. 17 where the API for the server 135 awaits another request from a device 105-125. If the request was not successful (STEP 1650), the process 1500 proceeds to control section O shown in and described with respect to FIG. 17 where the API for the server 135 awaits another request from a device 105-125.

Figure 21:
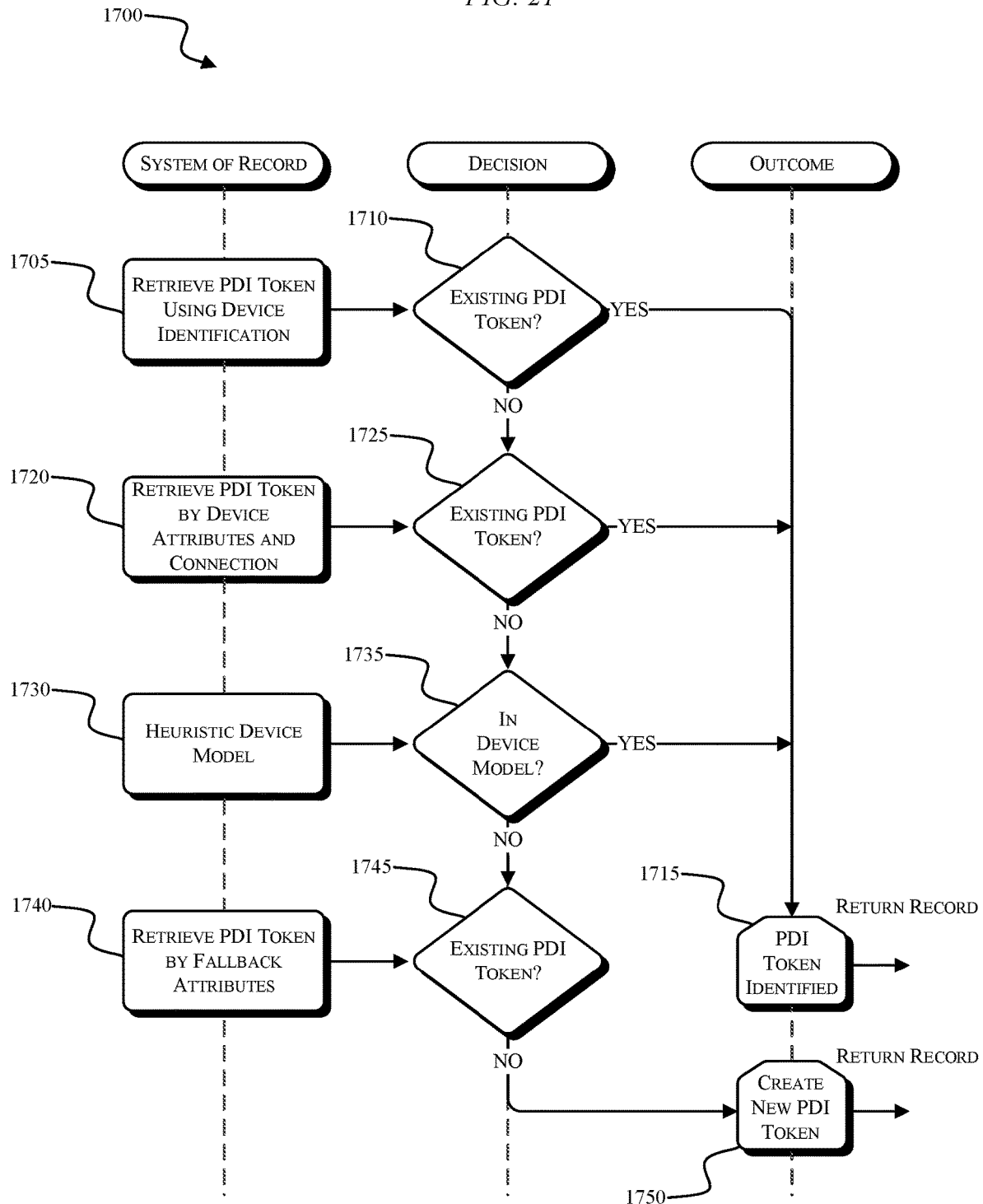
FIG. 21 is a process for retrieving and creating a PDI record, according to embodiments described herein.

FIG. 21 illustrates another process 1700 for retrieving and/or creating a PDI record or PDI token. Although the process 1700 is illustrated and described in a sequential, step-wise manner, it is possible for the server 135 to perform the illustrated steps in a different order than the particular, exemplary order shown in and described with respect to FIG. 21. For example, STEP 1720 can be performed before STEP 1705, or STEP 1705 and STEP 1720 can be skipped.

With reference to FIG. 21, the server 135 first attempts to identify a PDI token based on a device identification token (STEP 1705). The device identification token (e.g., browser cookies, HTML5 local storage variables, etc.) provides a high level of confidence that a device is the same as a previously identified device. As a result, if, at STEP 1710, there is an existing PDI token identified based on a device identification token, the process 1700 proceeds to STEP 1715 where the PDI token is identified and an associated PDI record is returned. In some implementations, the device identification token-based PDI token lookup can be skipped by encrypting the device identification token within a device identification payload (e.g., a PDI token) and timestamp information.

If there is no PDI token identified based on a device identification token at STEP 1710, the server 135 attempts to identify a PDI token based on device fingerprint attributes and device connection information (STEP 1720). The device fingerprint attributes (e.g., device fingerprint hashes) and connection information (e.g., IP address, proxy info, etc.) provide a reasonable estimation that a device is the same as a previously identified device. In some implementations, logic controlling against establishing low entropy device fingerprints can be executed when linking device fingerprints to a PDI record.

If, at STEP 1725, there is a PDI token identified based on device attributes and device connection information, the process 1700 proceeds to STEP 1715 where the PDI token is identified and an associated PDI record is returned. If there is no PDI token identified based on device attributes and device connections at STEP 1725, the server 135 attempts to identify a PDI token based on a heuristic device model (STEP 1730). The heuristic device model is described in greater detail below. If, at STEP 1735, there is a PDI token identified based on the heuristic device model, the process 1700 proceeds to STEP 1715 where the PDI token is identified and an associated PDI record is returned. If there is no PDI token identified based on the heuristic device model at STEP 1735, the server 135 attempts to identify a PDI token based on fallback attributes (STEP 1740).

For example, existing device fingerprint technologies create device fingerprints based on attributes of the device that are available from the device JavaScript and/or Mobile Native App SDK. However, such attributes are not always available to the server 135, such as with non-JavaScript browsers or other scenarios when HTTP traffic is directed straight to a customer application web server (e.g., automated web traffic, site aggregators, etc.). PDI can be used to identify devices in such situations based on server-side only fallback attributes. Fallback attributes include, for example, account ID, IP address, IP network information, HTTP headers such as user agent, etc. Such an operation can be performed instead of merely assigning static defaults (e.g., "d1-0000 . . . ", "d2-0000 . . . ", etc.). These server-side device fingerprints can be segmented from other transactions by inserting a prefix (e.g., "s"). As an illustrative example, the server 135 can hash the combination of the IP address and the HTTP user agent. If no device attributes are available, then a first device fingerprint, DFP1, can be created as follows: HASH(IP)="d1-s-3m393 . . . " A second device fingerprint, DFP2, can be created as follows: HASH(IP address+user agent)="d2-s-9384a . . . " The server-side device fingerprints based on fallback attributes can then be used to identify an existing PDI token (STEP 1745). If, at STEP 1745, there is a PDI token identified based on the fallback attributes, the process 1700 proceeds to STEP 1715 where the PDI token is identified and an associated PDI record is returned. If, at STEP 1745, there is no PDI token identified based on the fallback attributes, the server 135 creates a new PDI token and PDI record (STEP 1750). In some implementations, when a PDI token and PDI record were previously created based on fallback attributes, the server 135 can mark the PDI token and PDI record as suspicious.

STEPS 1730 and 1735 described above with respect to FIG. 21 and the process 1700 are related to the use of a heuristic device model by the server 135 to identify or create a PDI record. The device model is a defined set of parameters and logical statements for determining if a device is the same as a previously identified device. The device model includes a heuristic component that the server 135 uses to locate a subset of potential or candidate devices. The server 135 then executes a set of confidence functions to determine whether a correct device has been identified.

Figure 22:
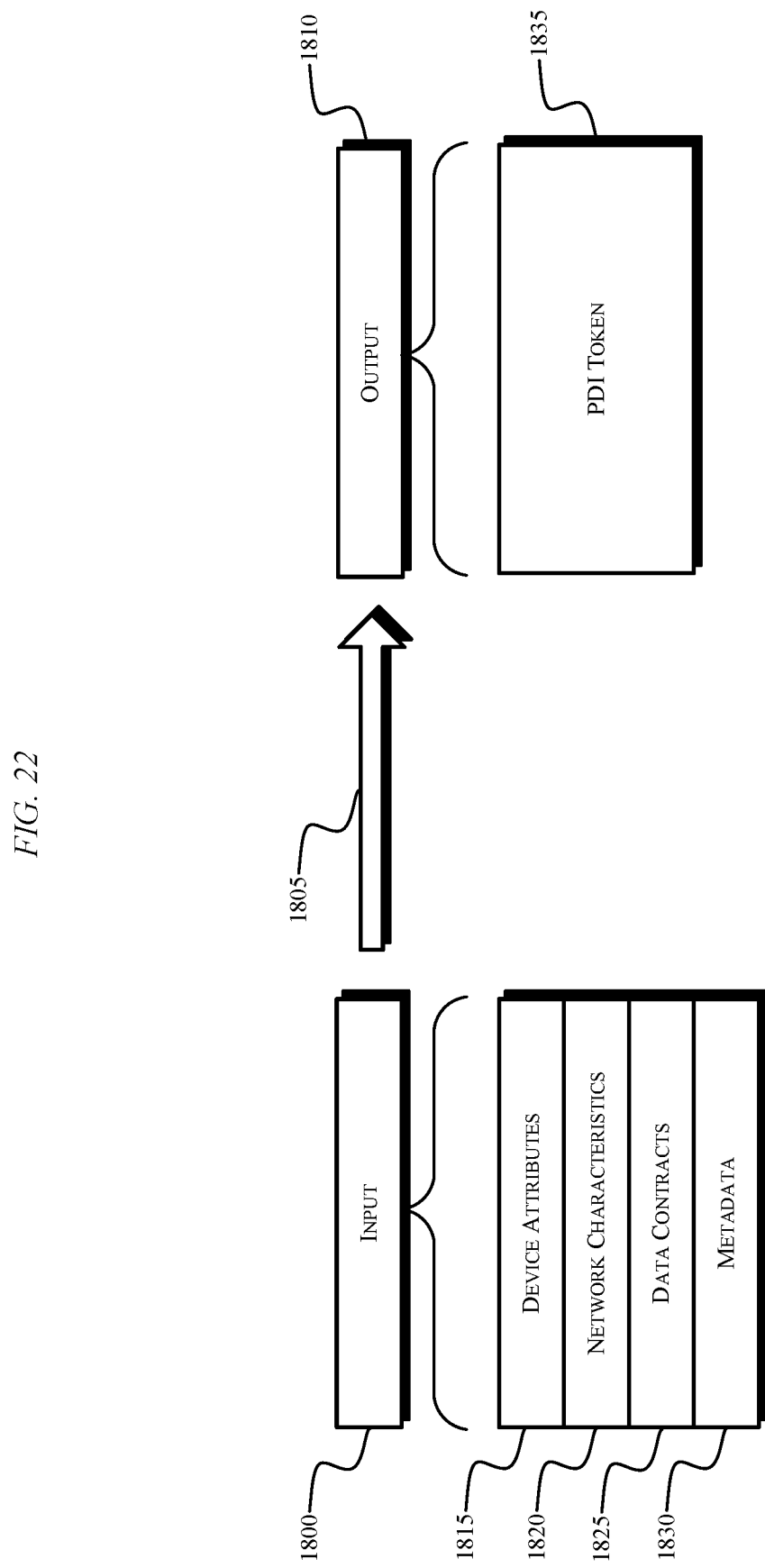
FIG. 22 illustrates using inputs to a device model to identify a PDI token, according to embodiments described herein.

For example, FIG. 22 illustrates the use of a device model to identify a PDI record. A set of input data 1800 is provided to the device model 1805, and the device model 1805 produces an output 1810. The set of input data 1800 includes device attributes 1815 (e.g., collected during JavaScript calls), network characteristics 1820 (e.g., IP and IP-derived information), data contracts 1825, and metadata 1830 (e.g., time of day). The set of input data is used to identify a PDI token 1835 associated with a device 105-125.

Figure 23:
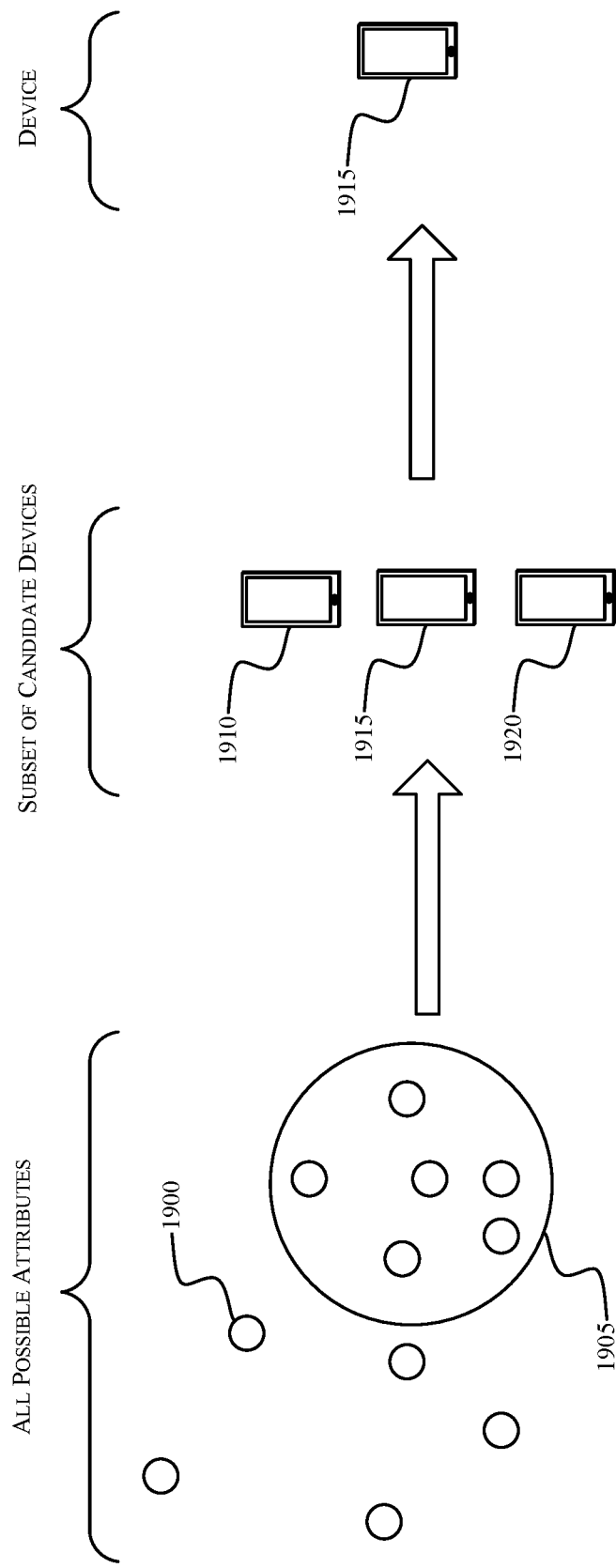
FIG. 23 illustrates PDI using a device model, according to embodiments described herein.

With reference to FIG. 23, the device model can be used by the server 135 to identify subsets of attributes 1900 that could be used to identify a device. The device model can treat all input attributes 1900 as potential units of identity, and makes use of clustered subsets of attributes to reduce the number of candidate devices. For example, a local cluster 1905 of attributes generally maps to a small subset of candidate devices that includes, for example, a first candidate device 1910, a second candidate device 1915, and a third candidate device 1920. If the server 135 has identified the device previously, the device will generally be included in the subset of candidate devices. The server 135 can then evaluate the subset of candidate devices to determine if the device is within the subset of candidate devices or whether there are no credible candidate devices in the subset of candidate devices.

The device model implemented by the server 125 does not require an index value (e.g., linking by account name). Rather the device model uses the attribute clusters 1905 to identify candidate devices. The server 135 can use any sequence of attributes 1900 in the attribute clusters 1905. The attribute clusters 1905 are preselected or predetermined sets of attributes that are likely to identify a device. Four attribute clusters are provided as illustrative examples of attributes that are likely to identify a particular device. CLUSTER 1 includes operating system, location, user token (e.g., account identification), and WebGL information. CLUSTER 2 includes operating system, IP address, canvas fingerprinting, WebGL information, screen information, and time zone. CLUSTER 3 includes operating system, screen information, IP provider, user token (e.g., account identification), and touch points. CLUSTER 4 includes user token (e.g., account identification), user agent, IP address, and time of day.

Figure 24:
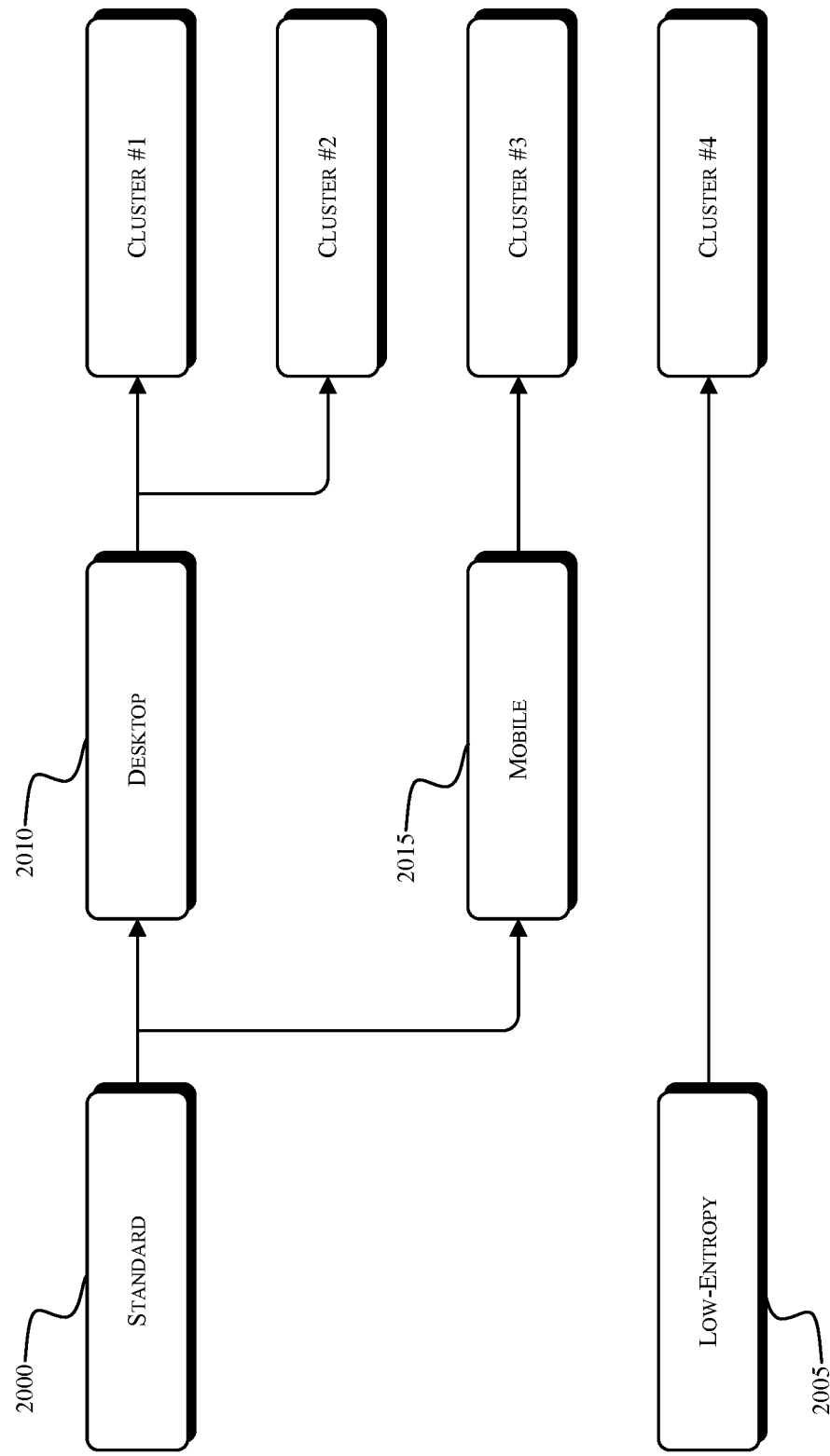
FIG. 24 illustrates an attribute cluster-based device search, according to embodiments described herein.

FIG. 24 illustrates the selection and execution of attribute clusters 1905. Cluster selection and execution can be divided into standard evaluations 2000 and low-entropy evaluations 2005, based on the circumstances of the transaction that caused the device model to be executed by the server 135. The standard evaluations 2000 can be further divided into evaluations related to desktop computers 2010 and mobile devices 2015. If, for example, the device is a desktop computer 2010, the server 135 evaluates search results for CLUSTER 1 and CLUSTER 2. If the device is a mobile device 2015, the server 135 evaluates search results for CLUSTER 3. For low-entropy situations 2005, the server 135 evaluates search results for CLUSTER 4. In some implementations, additional cluster divisions can be implemented by the server 135, such as iPhone and Android specific clusters.

After the attribute clusters 1905 have been selected and executed to produce a subset of candidate devices, the server 135 executes confidence constraints to identify the correct device in the subset of candidate devices. For example, after selecting and executing attribute clusters, the server 135 will have between zero and some non-zero number of candidate devices. If there are too many candidate devices, the server 135 can reject the search results and indicate that the searched cluster was not, for example, optimally tuned. If there are no candidate devices in the search results, no matching devices have been found.

When a subset of candidate devices has been identified, the server 135 is configured to iterate through a set of cluster-specific constraints to evaluate and identify the correct device among the subset of candidate devices. For example, evaluating the subset of candidate devices can include evaluating a number of matching attributes. In some implementations, an attribute cluster 1905 includes between two and approximately fifteen attributes. Confident device identification is achieved, for example, when at least one-quarter, at least one-third, at least one-half, or a majority of the attributes 1900 in the attribute cluster 1905 match a particular candidate device. In some implementations, particular attributes can override an otherwise satisfactory matching of attributes in the attribute cluster 1905. For example, if a majority of the attributes 1900 in the attribute cluster 1905 match a particular candidate device, but the user agent attribute for that particular candidate device does not match, the server 135 can prevent that particular candidate device from being matched.

The cluster-specific constraints can also include, for example, tenure, proximity between values, history of the device token and associated properties, and control against impossible scenarios, etc. As an illustrative example, the server 135 can be configured to: (1) remove any "impossible travel" candidate devices; (2) remove "impossible upgrades" (e.g., touch points on a mobile phone cannot change); and (3) select a device with the greatest overlap of matching attributes.

Figure 25:
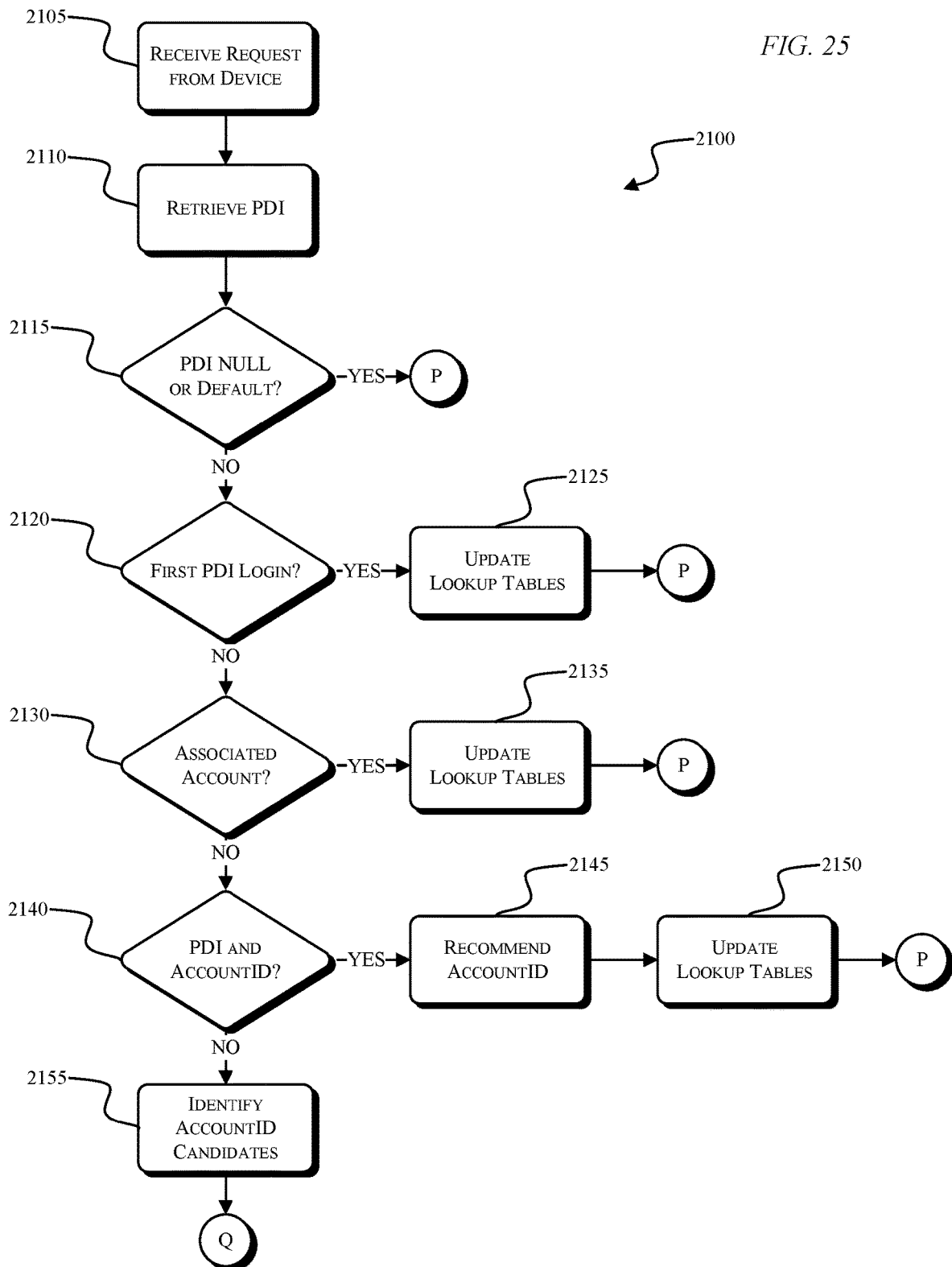
FIGS. 25, 26, and 27 are a process for using PDI to identify a user account, according to embodiments described herein.
Figure 26:
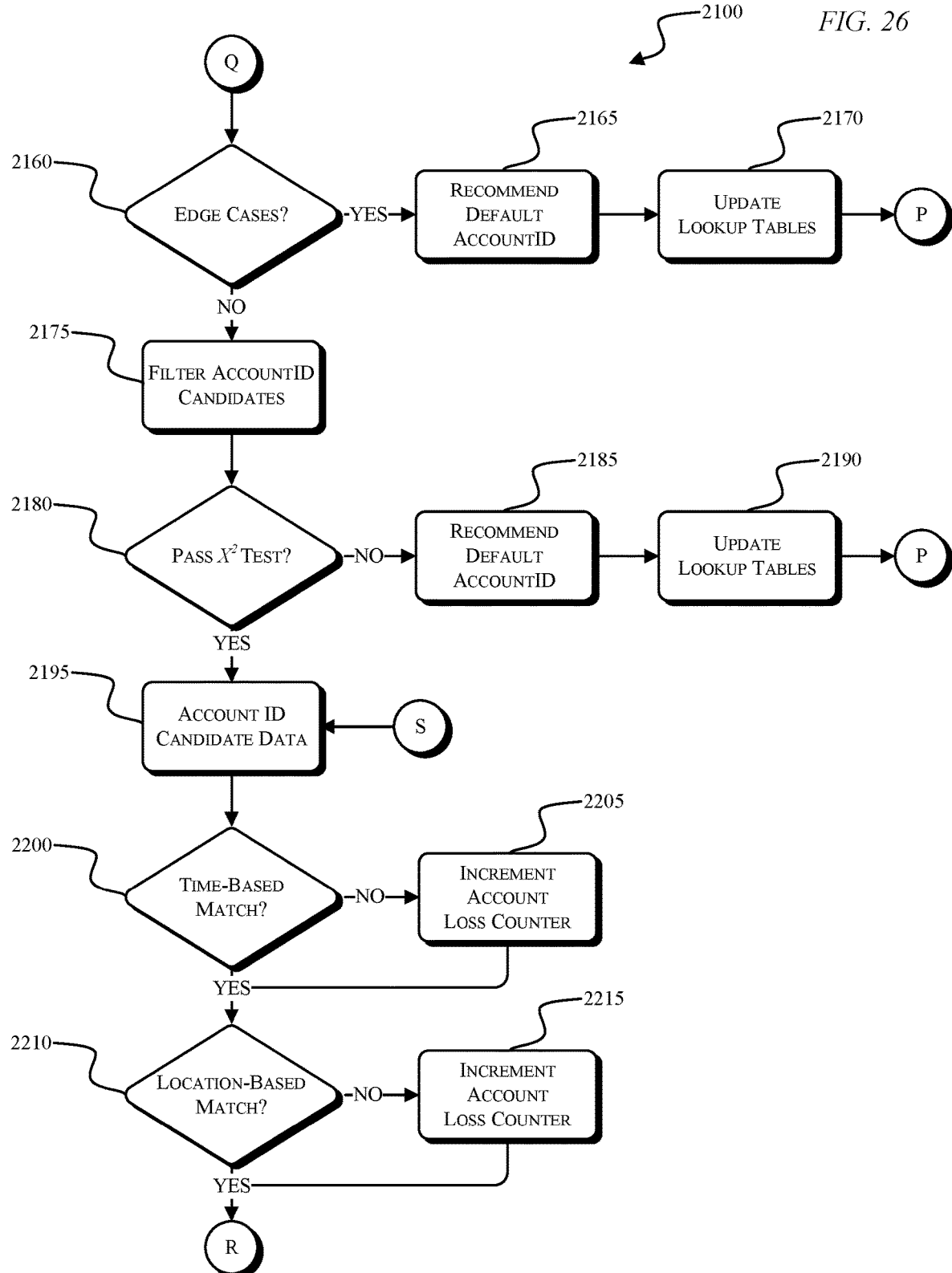
Figure 27:
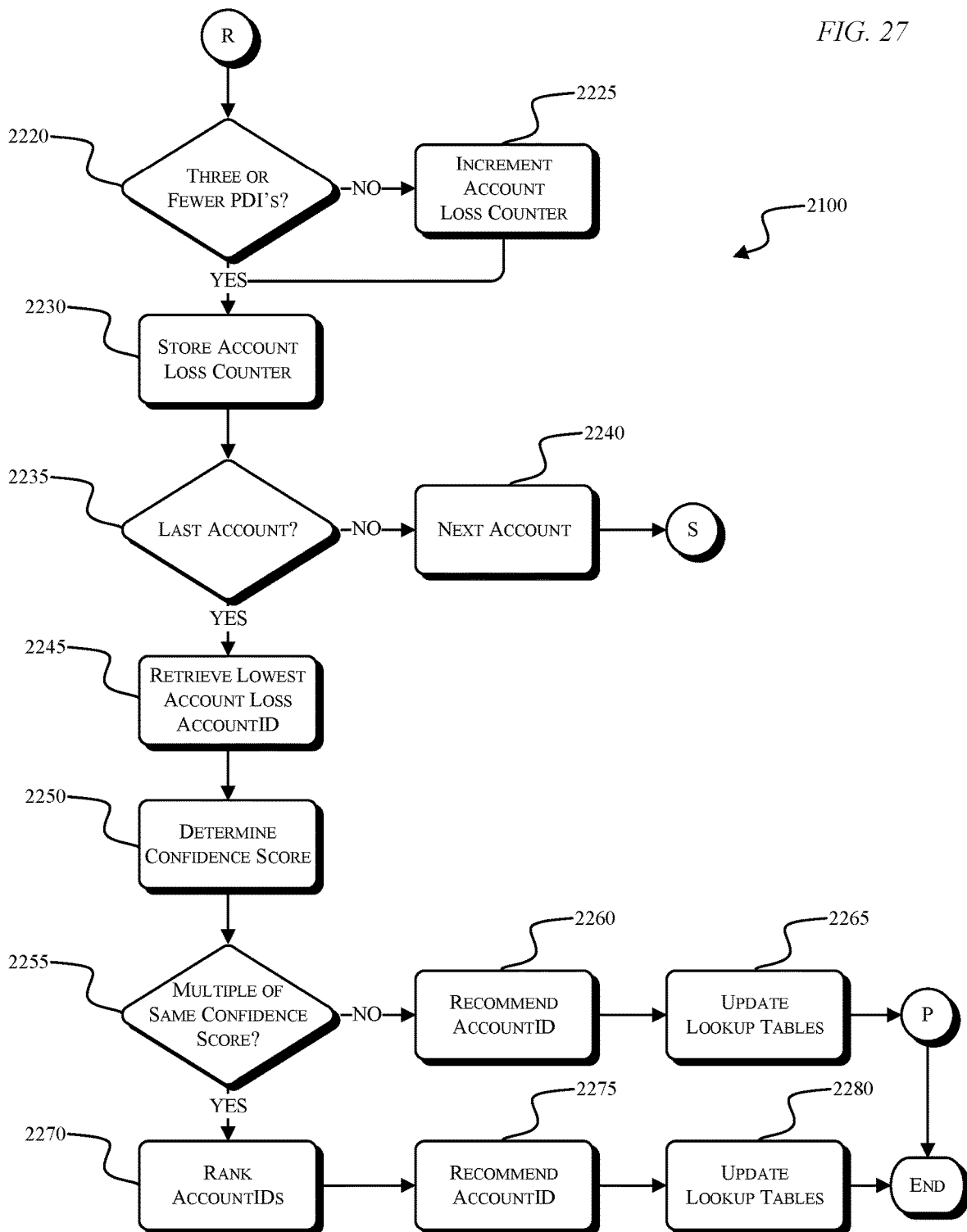

PDIs and retrieved PDI records can be applied in circumstances beyond confirming the identity of a particular device to, among other things, authorize an electronic transaction. For example, FIGS. 25-27 illustrate a process 2100 for recommending a user account (e.g., for an online service) based on PDI. For example, many websites provide the ability for users of the websites to login to a web-based account to receive customer-specific or tailored information (e.g., recommendations). However, of the user is not logged into a web-based account, PDI can be used to identify and recommend a user account associated with the user based on the user's device. Although the process 2100 is illustrated and described in a sequential, step-wise manner, it is possible for the server 135 to perform the illustrated steps in a different order than the particular, exemplary order shown in and described with respect to FIGS. 25-27. With reference to FIG. 25, the process 2100 begins with a request being generated at one of the devices 105-125 that is transmitted to the server 135 or the API associated with the server 135 (STEP 2105).

Based on the information provided in the request, a PDI associated with the device is identified and retrieved (STEP 2110), using any of the available techniques or combination of techniques for PDI retrieval described herein. At STEP 2115, the server 135 determines if the PDI is NULL or a default PDI. If the PDI is NULL or a default PDI, the process 2100 proceeds to control section P shown in and described with respect to FIG. 27. If, at STEP 2115, the PDI is not NULL or a default PDI, the server 135 determines whether the request is related to a first account login for the PDI (STEP 2120). If the request is related to a first account login for the PDI, PDI lookup tables are updated (STEP 2125) and the process 2100 proceeds to control section P shown in and described with respect to FIG. 27. If, at STEP 2120, the request is not related to the first account login for the PDI, the server 135 determines whether the request is already associated with an account (STEP 2130). If there is an account already associated with the request, PDI lookup tables are updated (STEP 2135) and the process 2100 proceeds to control section P shown in and described with respect to FIG. 27. If, at STEP 2130, there is no account already associated with the request, the server 135 determines whether there is only one PDI and account (i.e., account ID) combination (STEP 2140). If there is only one PDI and account combination, the server 135 recommends (e.g., transmits a recommendation signal to a merchant server) the account (STEP 2145) with a confidence of 1.0 (e.g., on a scale of 0.0 to 1.0) and updates the PDI lookup tables (STEP 2150). The process 2100 then proceeds to control section P shown in and described with respect to FIG. 27. If, at STEP 2140, there is more than one PDI and account combination, the server 135 identifies all account candidates (STEP 2155) before the process 2100 proceeds to control section Q shown in and described with respect to FIG. 27.

With reference to FIG. 26 and control section Q, the server 135 determines whether the PDI includes any edge cases (STEP 2160). Edge cases include, for example, PDIs with a 1:5 PDI to deviceID ratio, a PDI with too frequent logins, a PDI with a less than 10 PDI to account login ratio, etc. If the PDI includes edge cases, the server 135 recommends a default account (e.g., default account ID) corresponding to, for example, the account ID for the last PDI login (STEP 2165). PDI lookup tables are then updated (STEP 2170) and the process 2100 proceeds to control section P shown in and described with respect to FIG. 27. If the PDI does not include any edge cases, the server 135 filters account candidates (STEP 2175). For example, accounts with fewer than a threshold number of logins (e.g., three logins) can be filtered out as candidates. The remaining candidate accounts are evaluated by the server 135 to determine if the candidate accounts pass the chi-sq ("$X^2$") test for statistical differences (STEP 2180). If none of the candidate accounts pass the chi-sq test, the server 135 recommends a default account corresponding to, for example, the account ID for the last PDI login (STEP 2185). PDI lookup tables are then updated (STEP 2190) and the process 2100 proceeds to control section P shown in and described with respect to FIG. 27.

If a set of one or more candidate accounts pass the chi-sq test, each of the remaining, passing candidate accounts is evaluated. Starting with a first candidate account and associated account data at STEP 2195, the data associated with the accounts (e.g., login counts, location information, timestamps, etc.) is used to determine if there is a time-based match for the new request (STEP 2200). The time-based match can relate to, for example, the hour of the current request in the historical hour of day used by the account, or the day of the week of the current request in the historical days of the week used by the account. Other time-based metrics can also be used in different embodiments. If the new request does not match the account's time-based data, an account loss counter is incremented (STEP 2205). The account loss counter is used to disqualify accounts from candidacy, and the account with the lowest account loss counter can be recommended as the account for the request. After time-based matching, the data associated with the accounts is used to determine if there is a location-based match for the new request (STEP 2210). The location-based match can relate to, for example, historical locations used by the account (e.g., the top three locations used by the account). If the new request does not match the account's location-based data, the account loss counter is incremented (STEP 2215). The process 2100 then proceeds to control section R shown in and described with respect to FIG. 27.

With reference to FIG. 27 and control section R, after location-based matching, the data associated with the accounts is used to determine if there are fewer than a threshold number of PDIs associated with the account (e.g., three or fewer) (STEP 2220). If the account does not have three or fewer PDIs associated with the account, the account loss counter is incremented (STEP 2225). At STEP 2230, the account loss counter information associated with the account is stored to a memory for later use by the server 135. If, at STEP 2235, the most recently evaluated candidate account is not the last candidate account, the process 2100 selects the next candidate account (STEP 2240) and the process 2100 returns to control section S shown in and described with respect to FIG. 26. If, at STEP 2235, there are no additional candidate accounts to evaluate, the server 135 identifies and retrieves the data associated with the account or accounts having the lowest account loss counter values (STEP 2245), and determines confidence scores based on their respective account loss counters (e.g., confidence is scored between zero and one) (STEP 2250).

If, at STEP 2255, there are not multiple candidate accounts having the same confidence score, the server 135 recommends the highest value confidence account (STEP 2260). PDI lookup tables are then updated (STEP 2265) and the process 2100 proceeds to control section P where the process 2100 ends. If, at STEP 2255, multiple candidate accounts have the same confidence score, those candidate accounts are ranked based on, for example, last login time (STEP 2270). After the accounts are ranked, the highest ranked account is recommended by the server 135 (STEP 2275). PDI lookup tables are then updated (STEP 2280) and the process 2100 ends.

Thus, embodiments described herein provide, among other things, account recommendation based on server-side, persistent device identification. Various features and advantages are set forth in the following claims.

What is claimed is:

1. An account recommendation system comprising:
a server operable to identify a user account based on a server-side persistent device identification ("PDI") record, the server including a processor and a memory, the server configured to:
receive a request including one or more attributes related to a client device,
identify the server-side PDI record for the client device based on the one or more attributes of the client device,
identify one or more candidate accounts based on the server-side PDI record,
determine confidence scores for the one or more candidate accounts,
generate a recommendation signal for the user account associated with the client device based on the confidence scores, and
transmit the recommendation signal to a merchant server.

2. The account recommendation system of claim 1, wherein the one or more attributes include a device identification token, a device fingerprint, a location, a network attribute, and/or historical data associated with the client device.

3. The account recommendation system of claim 1, wherein the server is further configured to:
determine if any of the one or more candidate accounts is an edge case for which the server would recommend a default account identifier ("ID").

4. The account recommendation system of claim 1, wherein the server is further configured to:
filter the one or more candidate accounts to remove candidate accounts having fewer than a threshold number of logins.

5. The account recommendation system of claim 4, wherein the server is further configured to:
evaluate the filtered candidate accounts using a chi-squared test for statistical differences to identify a set of passing candidate accounts.

6. The account recommendation system of claim 5, wherein the server is further configured to:
determine whether, based on data associated with the set of passing candidate accounts, one or more of the set of passing candidate accounts is a time-based match for the request.

7. The account recommendation system of claim 6, wherein the time-based match is determined based on an hour of day of a historical request for each of the set of passing candidate accounts, and/or a day of the week of the historical request for each of the set of passing candidate accounts.

8. The account recommendation system of claim 7, wherein the server is further configured to:
determine whether, based on data associated with the set of passing candidate accounts, one or more of set of the passing candidate accounts is a location-based match for the request,
wherein the location-based match is determined based on a historical location used by each of the set of passing candidate accounts.

9. The account recommendation system of claim 8, wherein the server is further configured to:
determine whether one or more of the set of passing candidate accounts has fewer than a threshold number of associated PDIs.

10. The account recommendation system of claim 9, wherein the server is further configured to:
determine a confidence score for each passing candidate account in the set of passing candidate accounts based on an account loss counter for each passing candidate account.

11. The account recommendation system of claim 10, wherein the server is further configured to:
identify a passing candidate account having a highest value for the confidence score; and
generate the recommendation signal for the user account associated with the client device based on the passing candidate account having the highest value for the confidence score.

12. An account recommendation method comprising:
receiving, at a server, a request including one or more attributes related to a client device;
identifying a server-side persistent device identification ("PDI") record for the client device based on the one or more attributes of the client device;
identifying one or more candidate accounts based on the server-side PDI record;
determining confidence scores for the one or more candidate accounts;
generating a recommendation signal for a user account associated with the client device based on the confidence scores; and
transmitting the recommendation signal to a merchant server.

13. The account recommendation method of claim 12, wherein the one or more attributes include a device identification token, a device fingerprint, a location, a network attribute, and/or historical data associated with the client device.

14. The account recommendation method of claim 12, further comprising:
filtering the one or more candidate accounts to remove candidate accounts having fewer than a threshold number of logins;
evaluating the filtered candidate accounts using a chi-squared test for statistical differences to identify a set of passing candidate accounts; and
determining whether, based on data associated with the set of passing candidate accounts, one or more of the set of passing candidate accounts is a time-based match for the request.

15. The account recommendation method of claim 14, wherein the time-based match is determined based on an hour of day of a historical request for each of the set of passing candidate accounts, and/or a day of the week of the historical request for each of the set of passing candidate accounts.

16. The account recommendation method of claim 14, further comprising:
determining whether, based on data associated with the set of passing candidate accounts, one or more of the set of passing candidate accounts is a location-based match for the request.

17. The account recommendation method of claim 16, wherein the location-based match is determined based on a historical location used by each of the set of passing candidate accounts.

18. The account recommendation method of claim 17, further comprising:
determining whether one or more of the set of passing candidate accounts has fewer than a threshold number of associated PDIs.

19. The account recommendation method of claim 18, further comprising:
determining a confidence score for each passing candidate account in the set of passing candidate accounts based on an account loss counter for each passing candidate account;
identifying a passing candidate account having a highest value for the confidence score; and
generating the recommendation signal for the user account associated with the client device based on the passing candidate account having the highest value for the confidence score.

20. A non-transitory computer readable medium including computer executable instructions stored in the computer readable medium for controlling a device to:
receive a request including one or more attributes related to a client device;
identify a server-side persistent device identification ("PDI") record for the client device based on the one or more attributes of the client device;
identify a plurality of candidate accounts based on the server-side PDI record;
determine confidence scores for each of the plurality candidate accounts;
identify a candidate account of the plurality of candidate accounts having a highest value for a confidence score;
generate a recommendation signal for a user account associated with the client device based on the candidate account of the plurality of candidate accounts having the highest value for the confidence score; and
transmit the recommendation signal to a merchant server.

* * * * *